United States Patent [19]

Harashima et al.

[11] Patent Number: 5,602,759

[45] Date of Patent: Feb. 11, 1997

[54] MOTOR VEHICLE VIBRATING SYSTEM

[75] Inventors: Shokichi Harashima; Hiroshi Takahashi; Kazuo Shinomiya; Masakazu Kadota; Kazutoyo Yasuda, all of Wako, Japan

[73] Assignee: Honda Giken Kogyo Kabushiki Kaisha, Tokyo, Japan

[21] Appl. No.: 440,711

[22] Filed: May 15, 1995

Related U.S. Application Data

[62] Division of Ser. No. 831,569, Feb. 5, 1992, abandoned.

[30] Foreign Application Priority Data

| Feb. 6, 1991 | [JP] | Japan | 3-015568 |
| Feb. 6, 1991 | [JP] | Japan | 3-015569 |
| Sep. 20, 1991 | [JP] | Japan | 3-242002 |
| Oct. 2, 1991 | [JP] | Japan | 3-255467 |

[51] Int. Cl.$^6$ ............................... B65G 47/24
[52] U.S. Cl. ............................................ 364/508
[58] Field of Search .................... 364/508, 505, 364/506, 511, 512, 576, 578, 579, 424.05; 73/11.04, 11.05, 11.07, 11.08, 570, 579, 659, 669, 865.3, 662, 664

[56] References Cited

U.S. PATENT DOCUMENTS

| 3,710,082 | 1/1973 | Sloane et al. | 73/664 |
| 3,718,033 | 2/1973 | Petersen | 73/669 |
| 3,736,843 | 6/1973 | Leibundgut | 91/234 |
| 3,821,893 | 7/1974 | Klinger et al. | 73/118.1 |
| 3,848,115 | 11/1974 | Sloane et al. | 364/508 |
| 3,855,841 | 12/1974 | Hunter | 73/11.08 |
| 4,182,190 | 1/1980 | Huber et al. | 73/794 |
| 4,263,809 | 4/1981 | Petersen et al. | 73/798 |
| 4,265,123 | 5/1981 | Cappel | 73/663 |
| 4,513,622 | 4/1985 | Uretsky | 73/664 |
| 4,537,076 | 8/1985 | Lax et al. | 73/662 |
| 4,916,632 | 4/1990 | Doi et al. | 364/508 |
| 4,989,158 | 1/1991 | Sloane | 364/508 |
| 5,076,792 | 12/1991 | Niermann | 434/61 |
| 5,205,395 | 4/1993 | Bruno et al. | 198/389 |

FOREIGN PATENT DOCUMENTS

| 2219487 | 4/1971 | Germany . |
| 2201590 | 4/1979 | Germany . |
| 56-19706 | 5/1981 | Japan . |
| 61-157847 | 9/1986 | Japan . |
| 62-42350 | 10/1987 | Japan . |
| 3250335 | 11/1991 | Japan . |
| 1510492 | 5/1978 | United Kingdom . |
| 2053819 | 2/1981 | United Kingdom . |
| 8503547 | 8/1985 | WIPO . |

OTHER PUBLICATIONS

Alschweig et al., *Motorradprufstand zur wirklichkeitsnahen Simulation von Fahrbetriebsbeanspruchungen*, 180 ATZ Automobiltechnische Zeitschrift, vol. 82 (1980), pp. 135–138.

Alschweig et al., *Motorcycle Test–Rig With Multiaxial Load Input for a Service–Like Simulation*, 180 ATZ Automobiltechnische Zeitschrift, vol. 82 (1980) Mar., No. 3, Stuttgart, pp. 135–138.

Primary Examiner—Kevin J. Teska
Assistant Examiner—Stephen J. Walder, Jr.

[57] ABSTRACT

A motor vehicle vibrating system vibrates a motor vehicle having front and rear axles rotatably supported on a motor vehicle frame to simulate the load which would be applied from an actual road to the motor vehicle. The motor vehicle vibrating system has a first vibrator for vertically vibrating the rear axle, a second vibrator for vertically vibrating the front axle, and a third vibrator for vibrating one of the front and rear axles back and forth in a longitudinal direction of the motor vehicle.

7 Claims, 21 Drawing Sheets

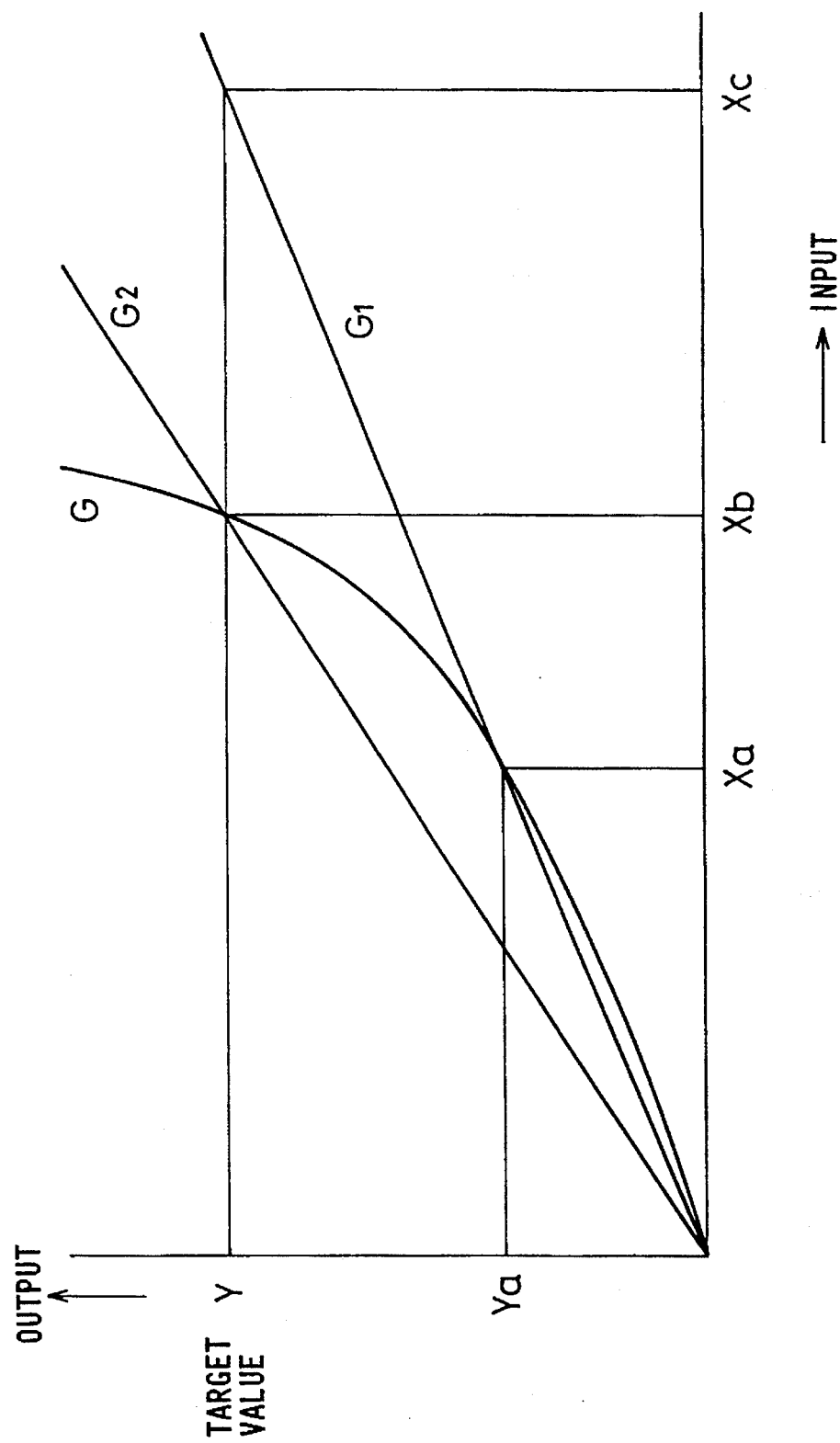

FIG. 7

$$\begin{bmatrix} Y_1 \\ Y_2 \\ Y_3 \end{bmatrix} = \begin{bmatrix} G_{11} & G_{21} & G_{31} \\ G_{12} & G_{22} & G_{32} \\ G_{13} & G_{23} & G_{33} \end{bmatrix} \begin{bmatrix} X_1 \\ X_2 \\ X_3 \end{bmatrix}$$

FIG. 8

$$\begin{bmatrix} X_1 \\ X_2 \\ X_3 \end{bmatrix} = \begin{bmatrix} G_{11} & G_{21} & G_{31} \\ G_{12} & G_{22} & G_{32} \\ G_{13} & G_{23} & G_{33} \end{bmatrix}^{-1} \begin{bmatrix} Y_1 \\ Y_2 \\ Y_3 \end{bmatrix}$$

MOTOR VEHICLE VIBRATING SYSTEM

This application is a divisional of application Ser. No. 07/831,569, filed on Feb. 5, 1992, now abandoned, the entire contents of which are hereby incorporated by reference.

BACKGROUND OF THE INVENTION

1. Field of the Invention

The present invention relates to a vibrating system for simulating, on a test bench, the load which would be applied from an actual road to a motor vehicle such as an automobile, a motorcycle, or the like, and also simulating three-dimensional vibrations as of an earthquake applied to such a motor vehicle, and a method of controlling such a vibrating system.

2. Description of the Background

Vibrating systems which are capable of simulating the loads applied from actual roads to completed motor vehicles on test benches are widely used for performance evaluation, durability tests, and various other purposes as they are highly effective in the development of automobiles, motorcycles, or the like. Conventional vibrating systems for motorcycles are generally designed to vibrate the motorcycle through a wheel mounted on an axle. These conventional vibrating systems, however, can only simulate the load which would be applied from a relatively flat road to a motorcycle. When the motorcycle is vibrated at an increased rate, the tire of the wheel tends to jump from a vibrating table. Therefore, it has been difficult for the conventional vibrating systems to simulate the loads from actual roads accurately.

Heretofore, an early method of controlling a vibrating system vibrates a motor vehicle several times with noise characterized by a predetermined distribution of absolute values of a Fourier spectrum, and effects repeated corrective calculations for simulating actual running data based on a transfer function that has been determined from the data measured when the motor vehicle is vibrated.

The prior method is also difficult to simulate the loads from actual roads with accuracy especially when the motor vehicle to be vibrated is a motorcycle or the like.

More specifically, the transfer function used in the conventional control method is linearly approximated as measured with a certain vibration level. When a motorcycle is vibrated, however, the motorcycle reacts with relatively strong nonlinearity due, for example, to the bottoming of a suspension thereof. The linear approximation of the transfer function is therefore not suitable for use in motorcycle vibration tests. Even with the corrective calculations being repeated based on the transfer function obtained from the vibratory measurements, therefore, it is difficult to simulate the roads applied from actual roads. Specifically, as shown in FIG. 3 of the accompanying drawings, if a transfer function G1 that is determined from a target signal Ya when a vibrating signal Xa is applied is employed, then a vibrating signal Xc, which is wrong in reality, is determined as being necessary to obtain a target signal Y. When the vibrating signal Xc is applied, a target signal is produced using an actual transfer function G, in excess of the target signal Y. Therefore, if the target signal Y is of a value immediately prior to the bottoming of the suspension, then the motorcycle being tested will be damaged by the applied vibration. That is, if an input vibrating signal applied to measure a transfer function is larger than the vibrating signal Xb, then the motorcycle to be vibrated will be subjected to an excessively large load.

In known vibrating systems for motorcycles, it has been customary to place a weight, as heavy as an ordinary rider, fixedly on the rider's seat of the motorcycle. According to a conventional method in which an equivalent weight of a rider is imposed on the motorcycle, the weight tends to move in unison with the rider's seat, making it impossible to simulate an actual rider whose moves vertically with a slight time lag with respect to the seat.

One practice would be to vibrate the motorcycle with a weight simply placed on the seat. However, the weight would move on the seat when the motorcycle is strongly vibrated, tending to shift the combined motorcycle and weight system laterally out of balance, and the weight might eventually slip off the seat.

There is known a three-dimensional vibrating machine for exerting three dimensional vibrations to an object to observe its vibration-resistant capability. The known three-dimensional vibrating machine comprises an X-axis linear actuator slidably mounted on a guide surface on a base by a static pressure bearing for linear sliding movement along an X-axis, a Y-axis linear actuator slidably mounted on a guide surface on the X-axis linear actuator by a static pressure bearing for linear sliding movement along a Y-axis, and a Z-axis linear actuator slidably mounted on a guide surface on the Y-axis linear actuator by a static pressure bearing for linear sliding movement along a Z-axis. When the X-, Y-, and Z-axis linear actuators are driven, they apply vibrations to a vibrating table of the three-dimensional vibrating machine.

There are also known a bidirectional vibratory testing apparatus for imposing vibrations only in horizontal and vertical directions through spherical bearings, and a three-dimensional vibratory testing apparatus comprising an X-axis movable frame and a Y-axis movable frame that are held in engagement with a Z-axis movable frame, for applying three-dimensional vibrations to a vibrating table.

The three-dimensional vibrating machines are structurally complex as they require guides, spherical bearings, frames, and various other components. Those three-dimensional vibrating machines which employ spherical bearings produce vibrations of limited amplitudes. Those three-dimensional vibrating machines which employ guides and frames have difficulty in controlling vibrations in a high-frequency range because large inertial forces are produced as the vibrating table vibrates. In the case where the Y- and Z-axis linear actuators are mounted on the X-axis linear actuator, the actuators are liable to swing back and forth on account of their acceleration, failing to achieve a high degree of control accuracy.

SUMMARY OF THE INVENTION

In view of the foregoing drawbacks of the conventional vibrating apparatus, it is an object of the present invention to provide a motor vehicle vibrating system for accurately simulating the load which would be applied from an actual road to a motor vehicle or the like.

Another object of the present invention is to provide a method of controlling a motor vehicle vibrating system for accurately simulating the load which would be applied from an actual road to a motor vehicle or the like.

Still another object of the present invention is to provide a motor vehicle vibrating system having a rider weight applying structure that is capable of accurately simulating the load which would be applied from an actual road to a motor vehicle or the like with a rider seated thereon.

Yet still another object of the present invention is to provide a three-dimensional motor vehicle vibrating system which has a high degree of control accuracy, can produce vibrations of relatively large amplitudes, and is simple in structure.

According to the present invention, there is provided a vibrating system for vibrating a motor vehicle having front and rear axles rotatably supported on a motor vehicle frame, comprising a first vibrator for vertically vibrating the rear axle, a second vibrator for vertically vibrating the front axle, and a third vibrator for vibrating one of the front and rear axles back and forth in a crossing direction of the motor vehicle to said vertically vibrating direction.

The vibrating system further comprises a reactive jig for limiting the other of the front and rear axles through a link mechanism against back-and-forth movement in the longitudinal direction of the motor vehicle, a vibrating rod through which the third vibrator vibrates said one of the front and rear axles, load detecting means on the vibrating rod, for detecting a load imposed on the vibrating rod, and a controller for controlling the third vibrator when the first and second vibrators operate so that the load detected by the load detecting means is of a constant value at all times.

The vibrating system also includes spacers fitted over at least one of the front and rear axles and disposed inwardly of spaced members extending from the motor vehicle members, said at least one of the front and rear axles having a vibrating point on a substantially central portion thereof to which vibrations are applied from the vibrator. The vibrating system also includes a reactive jig for limiting the other of the front and rear axles through a link mechanism against back-and-forth movement in the longitudinal direction of the motor vehicle, the link mechanism comprising a pair of parallel link arms spaced transversely from each other, a cross member interconnecting the link arms, the link arms being adjustable in length relatively to each other. The vibrating system further includes strain gages attached to respective suspensions which support the front axle.

The vibrating system further has a reactive jig disposed behind the rear axle, for vertically movably supporting the rear axle through a link mechanism having a pair of parallel link arms extending forwardly and spaced transversely from each other, and a rider weight applying structure including a weight corresponding to the weight of a driver of the motor vehicle and placed on a seat of the motor vehicle, the weight being vertically movably supported by a second pair of parallel link arms extending forwardly from the reactive jig. The vibrating system also includes a second weight corresponding to the weight of a passenger of the motor vehicle and placed on the seat of the motor vehicle, the weight and the second weight being vertically movably coupled to each other by a third pair of parallel link arms, the second weight being vertically movably supported by the second pair of parallel link arms extending forwardly from the reactive jig.

According to the present invention, there is also provided a method of controlling a vibrating system for forcibly vibrating a motor vehicle to simulate a load which would be applied from an actual road, the method comprising the steps of determining a temporary transfer function produced when the motor vehicle is vibrated with initial vibration noise pattern determining a first vibration signal to be applied to said motor vehicle from the temporary measured transfer function and data produced while the motor vehicle is actually running, comparing values of respective Fourier transform frequencies of vibration data produced when the motor vehicle is vibrated with said first vibrating signal and Fourier transform frequencies of the data produced while the motor vehicle is actually running, to determine whether the compared data are close to each other, incrementing the Fourier transform frequencies and repeating the comparing step until the compared values become close to each other within a predetermined tolerance, determining values of the respective Fourier transform frequencies of the first vibrating signal when the compared data become close to each other within the allowable range, vibrating the motor vehicle a plurality of times with a group of vibration noise patterns to determine a permanent transfer function, determining a second vibrating signal based on said permanent transfer function, and subjecting the motor vehicle to a vibration test according to said second vibrating signal to simulate the data produced while the motor vehicle is actually running.

According to the present invention, there is further provided a method of controlling a vibrating system for forcibly vibrating a motor vehicle to simulate a load which would be applied from an actual road, comprising the steps of determining a temporary transfer function $Ga(f)$ from predetermined vibration noise patterns and an output signal produced by a vibration detector attached to the motor vehicle, when the motor vehicle is vibrated by applying said predetermined noise pattern to a vibrator for vibrating the vehicle, calculating an inverse function $Gb^{-1}(f)$ of the temporary transfer function $Ga(f)$, converting an output signal $Y(t)$, produced by the vibration detector while the motor vehicle is actually running, into a signal $Y(f)$ by Fourier transformation, multiplying the inverse function $Gb^{-1}(f)$ by the signal $Y(f)$ to produce a product signal, subjecting the product signal to inverse Fourier transformation to provide a time domain vibrating signal $x_{(n)}(t)$, determining a difference signal $E_{(n)}(f)$ between the absolute value of the signal $Y(f)$ and the absolute value of a signal $Y_{(n)}(f)$, which is a Fourier transform of the output signal produced by the vibration detector when the vibrating signal $x_{(n)}(t)$ is supplied as an initial value to the vibrator to vibrate the motor vehicle, successively correcting the vibrating signal until the difference signal $x_{(n)}(t)$ and repeating said determining step $E_{(n)}(f)$ falls within a predetermined allowable error range, calculating a permanent transfer function $Gar(f)$ with a group of noise patterns, wherein a distribution of absolute values of a Fourier spectrum of said noise patterns is equal to the vibrating signal $x_{(n)}(t)$ produced when the difference signal $E_{(n)}(f)$ falls within the predetermined allowable error range, and subjecting said motor vehicle to a predetermined vibration test employing a vibrating signal determined from said permanent transfer function $Gar(f)$.

The method further includes the step of determining the vibrating signal $x_{(0)}(t)$ as an initial value by inverse Fourier transformation of a signal which is produced by multiplying the inverse function $Gb^{-1}(f)$ by a safety coefficient $k$ ($0<k\leq 1$).

The method also comprises the steps of determining the product of the difference signal $E_{(n)}(f)$ and the absolute value of a signal which is produced by multiplying the inverse function $Gb^{-1}(f)$ by a safety coefficient $k$ ($0<k\leq 1$), adding the absolute value of a Fourier transform of the vibrating signal to the product to provide a sum signal, and successively incrementing the vibrating signal and adding the sum signal thereto.

The output signal $Y(t)$ is a signal produced immediately prior to suspension bottoming while the motor vehicle is actually running.

The predetermined noise may be white noise or noise whose distribution of absolute values of a Fourier spectrum is inversely proportional to the square of a frequency in a frequency range in which the transfer function is to be determined.

According to the present invention, there is further provided a vibrating system for imposing three-dimensional vibrations, comprising a vibrating table for placing an object to be vibrated thereon, a single horizontal X-axis vibrator for applying a signal to the vibrating table, two horizontal Y-axis vibrators for applying opposite moments to the vibrating table, three vertical Z-axis vibrators positioned at respective vertices of a triangle, for imposing vertical movement to the vibrating table, a plurality of transducers disposed near respective positions in which the vibrators are connected to the vibrating table, and a controller for determining a transfer function matrix from predetermined noise and output signals produced by the transducers when the predetermined noise is supplied to the vibrators to vibrate the vibrating table, and for producing a signal to vibrate the vibrating table in a desired state using an inverse matrix of the transfer function matrix.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram showing an actual transfer function and an approximate transfer function;

FIG. 7 is a diagram showing the relationship between a transfer function matrix and input and output signals in a multi-axis motor vehicle vibrating system;

FIG. 8 is a diagram showing the relationship between an inverse transfer function matrix and input output signals in a multi-axis motor vehicle vibrating system;

DETAILED DESCRIPTION OF THE PREFERRED EMBODIMENTS

A motor vehicle vibrating system according to a first embodiment of the present invention will be described below with reference to FIGS. 1 through 8.

Figure 1:
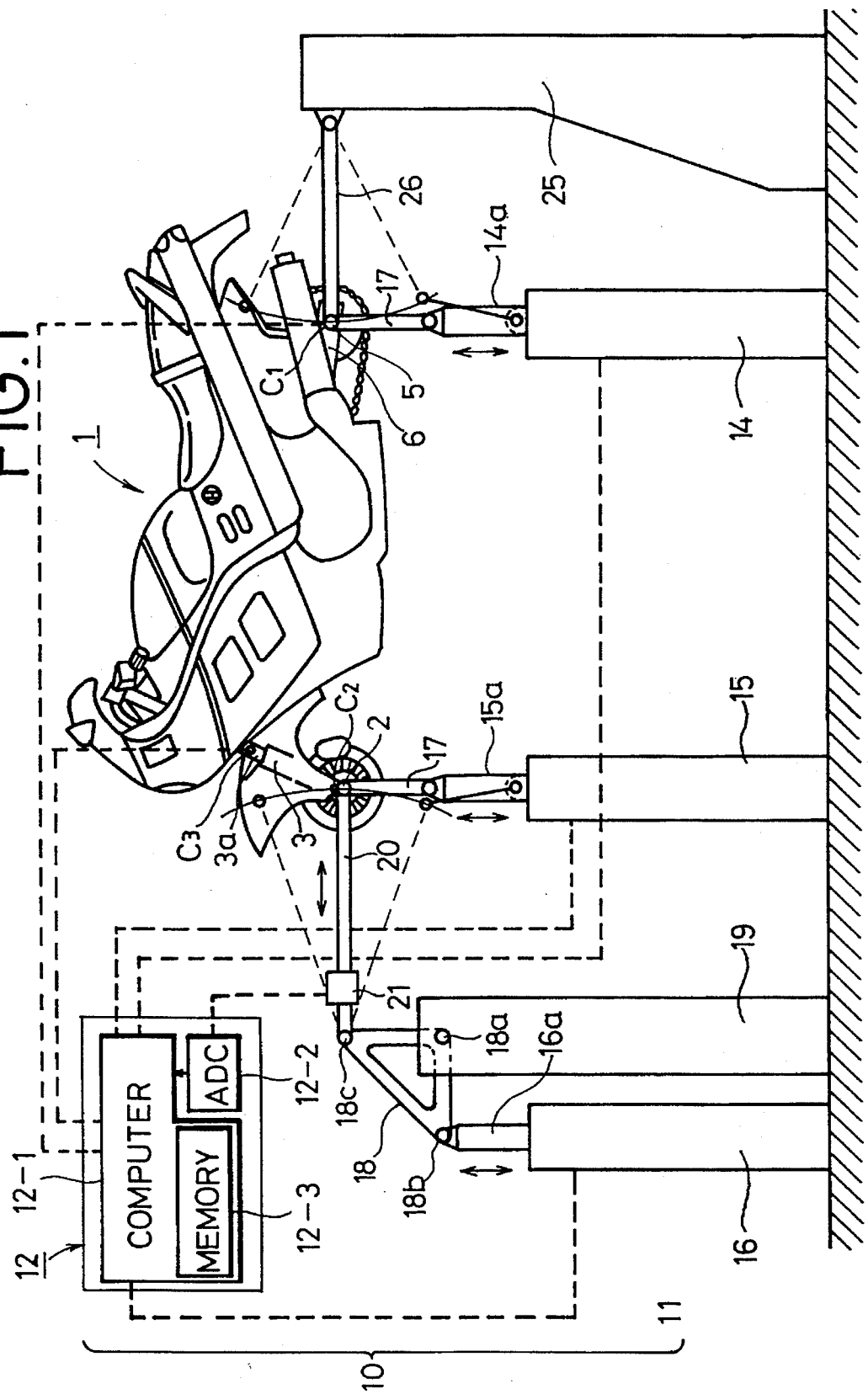
FIG. 1 is a side elevational view, partly in block form, of a motor vehicle vibrating system according to a first embodiment of the present invention.

FIG. 1 shows in side elevation the motor vehicle vibrating system according to the first embodiment. The motor vehicle vibrating system is shown as being applied to a system for performing road simulations for motorcycles. A motorcycle, generally denoted at 1, which is to be vibrated by the vibrating system, has front and rear wheels removed. The motorcycle 1 has a front axle 2 rotatably supported on a motorcycle frame (not shown) through a telescopic suspension 3, and a rear axle 5 mounted on a rear fork 6 that is swingably supported on a rear cushion (not shown) combined with a link mechanism.

The motor vehicle vibrating system includes an axle vibrating device 10 for directly vibrating the front and rear axles 2, 5 of the motorcycle 1. The axle vibrating device 10 comprises a mechanical assembly 11 for actually vibrating the front and rear axles 2, 5 and a controller 12 for controlling the mechanical assembly 11.

The mechanical assembly 11 comprises a first vibrator 14 for vertically vibrating the rear axle 5, a second vibrator 15 for vertically vibrating the front axle 2, and a third vibrator 16 for vibrating the front axle 2 back and forth in the longitudinal direction of the motorcycle 1. The vibrators 14, 15, 16 comprise respective double-acting hydraulic cylinders capable of applying both tensile and compressive forces.

The first and second vibrators 14, 15 have respective piston rods 14a, 15a whose distal ends are coupled to connecting rods 17, respectively, through pins. The connecting rods 17 have ends connected to the respective axles 2, 5 by pins remotely from the piston rods 14a, 15a. The third vibrator 16 has a piston rod 16a whose end is coupled to an end 18b of a swing plate 18 by a pin. The swing plate 18 is substantially in the shape of a triangle as viewed in side elevation. The swing plate 18 has a central corner 18a swingably supported on an upper end portion of a support column 19. The swing plate 18 also has an end 18c coupled to an end of a substantially horizontally extending vibrating rod 20 by a pin. The other end of the vibrating rod 20 is coupled to the front axle 2 by a pin. When the piston rod 16a of the third vibrator 16 is vertically extended or contracted, the swing plate 18 is angularly moved about the central corner 18a thereby to move the vibrating rod 20 horizontally, thus vibrating the front axle 2 back and forth horizontally. The vibrating rod 20 is combined with a load detector 21 mounted thereon. A rigid reactive jig 25 for limiting the back-and-forth horizontal movement of the motorcycle 1 is coupled to the rear axle 5 through a link arm 26.

A method of vibrating the motorcycle 1 using the vibrating system shown in FIG. 1 will be described below. The structure of the controller 12 for controlling the axle vibrating device 10 will be described with reference to the vibrating method.

The first, second, and third vibrators 14, 15, 16 are controlled in their displacement. Such displacement control is higher in speed or acceleration than load control, making it possible to increase the accuracy with which the load that would be applied from an actual road to the motorcycle 1 is simulated.

The back-and-forth horizontal movement of the rear axle 5 is limited by the link arm 26 that is coupled to the reactive jig 25 by a pin. When the first and second vibrators 14, 15 are actuated, the lefthand end (as viewed in FIG. 1) of the link arm 26 is caused to follow an arcuate path as shown, imposing an undue horizontal compressive or tensile load on the motorcycle 1. To eliminate such a drawback, the vibrating system carries out a learning process described below. Stated otherwise, since the learning process is carried out, the vibrating system can effect high-speed displacement control on the first, second, and third vibrators 14, 15, 16 though the rear axle 5 is supported by the reactive jig 25 that is very simple in structure.

Figure 2:
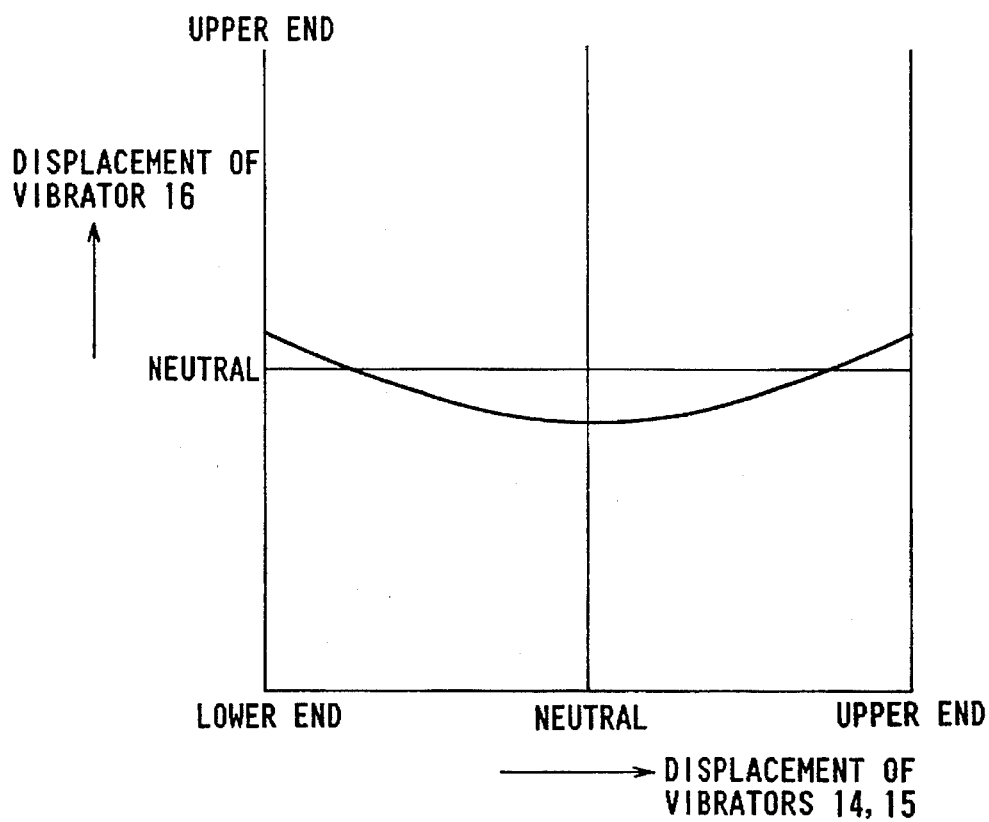
FIG. 2 is a diagram showing a control map used for controlling displacement of a third vibrator in the motor vehicle vibrating system according to the first embodiment.

A computer 12-1 in the controller 12 is instructed to control the hydraulic cylinder of the third vibrator 16 so that the load detected by the load detector 21 has a value of 0 at all times. Then, the computer 12-1 issues command signals to actuate the first and second vibrators 14, 15 to move the lower ends of the respective piston rods 14a, 15a from a lowermost position to a vibration stroke neutral position at a low speed (which is low enough to keep the load detected by the load detector 21 zero at all times with the third vibrator 16 operating with the first and second vibrators 14, 15). At this time, the path followed by the piston rod 16a of the third vibrator 16 is stored in a memory 12-3 of the computer 12-1 through an A/D converter 12-2. The stored path is shown in the map of FIG. 2. In this manner, the displacement of the third vibrator 16 is stored in relation to the displacement of the first and second vibrators 14, 15. Then, a displacement control process is selected to actuate the third vibrator 16 along the curve shown by the stored map of FIG. 2, and the first and second vibrators 14, 15 are actuated to cause the lower ends of their piston rods 14a, 15a to reach their vibration stroke neutral position. At this time, the third vibrator 16 is caused to move along the curve of the map shown in FIG. 2 until the lower end of the piston rod 16a of the third vibrator 16 reaches the vibration stroke neutral position. Therefore, the vibrators 14, 15, 16 are operated according to an input signal (described below) to apply the load of an actual road to the motorcycle 1. When the vibrators 14, 15, 16 are to be stopped, the third vibrator 16 is also caused to move along the curve in the map shown in FIG. 2 until it is finally stopped. The map shown in FIG. 2 can be plotted in one learning process effected with respect to one motorcycle. Once the map has been plotted, the vibrating system can be started or stopped in operation stably according to the plotted map though such starting or stopping procedure may be slightly complex.

Now, the method of vibrating the motorcycle 1 with the vibrating system will be described below. In accelerated durability tests for the motorcycle 1, the suspensions of the motorcycle 1 are apt to suffer bottoming, and a maximum load is applied to the motorcycle 1 upon bottoming of the suspensions. It is critical for the vibrating system to simulate such a maximum load in actual running conditions in strength/durability tests.

The vibrating system of this type normally employs a control program that is based on a linearly approximated transfer function, and such a control system is not suitable for the simulation of highly nonlinear phenomena such as suspension bottoming. More specifically, as shown in FIG. 3, an actual transfer function is a nonlinear transfer function G, but is approximated by a linear transfer function. If an approximate transfer function G1 that is tangent to an actual transfer function based on a vibrating signal Xa is used, then a vibrating signal Xc has to be applied in order to obtain a target signal Y. When the vibrating signal Xc is applied, however, a target signal that is produced using the transfer function G is in excess of the target signal Y. If the target signal Y causes suspension bottoming, then the motorcycle being tested will be damaged by the applied vibration. To avoid this shortcoming, it is effective to develop the same degree of bottoming as that which is produced when the motorcycle is actually running, and to measure a transfer function at this time. That is, as shown in FIG. 3, in order to reproduce the target signal Y, a transfer function G2 measured with a signal Xb having the same magnitude as that when the motorcycle is actually running is more approximating than the transfer function G1 measured with the signal Xa. The vibrating signal Xb is a signal that can reproduce, on a test bench, a distribution of absolute values of a Fourier spectrum of the output signal Y (hereinafter the reference character "Y" is also used to denote the output signal). The vibrating signal Xb and the transfer function G2 measured therewith are determined according to the following procedure (see FIG. 4):

First, a noise signal which is indicative of white noise, noise having $1/f^2$ characteristics, or any of various noises that are experimentally produced is applied as a vibrating signal $x_{in}(t)$ to vibrate the motorcycle 1. An output signal $y_{in}(t)$ that is produced by a transducer is measured. Then, a temporary transfer function Ga(f), which is a ratio of Fourier transformation between the output signal $y_{in}(t)$ and the vibrating signal $x_{in}(t)$, is determined from the output signal $y_{in}(t)$ and the vibrating signal $x_{in}(t)$ in a step S1.

The calculation of the transfer function Ga(f) is described below with respect to a single-axis vibrating system. To determine an output signal produced when the first vibrator 14 is vibrated, an accelerometer $C_1$ is attached to the rear fork 6 above the rear axle 5, and the behavior of the rear fork 6 is measured by the accelerometer $C_1$. The accelerometer C1, an accelerometer $C_2$, and a strain gage $C_3$ (described below) correspond to the transducer referred to above. The measured value is divided by the noise signal that is applied to the first vibrator 14, thereby determining the transfer function Ga(f). With respect to the second vibrator 15 or the third vibrator 16, the accelerometer $C_2$ is attached to the suspension 3 above the front axle 2, and the strain gage $C_3$ is attached to an inner pipe 3a below a bottom bridge of the suspension 3. The measured values from the accelerometer $C_2$ and the strain gage $C_3$ are divided by the vibrating signal, thereby calculating the transfer function Ga(f).

After the step S1, an inverse function $Gb^{-1}(f)$ of the transfer function Ga(f) is calculated, and multiplied by a safety coefficient k ($0<k\leq1$) thereby to determine a transfer function Ha(f) in step S2. The safety coefficient k is multiplied to establish a relatively small initial value so that the motorcycle being tested will not be subjected to an excessively large load by an excessively strong vibrating signal.

After the step S2, an output signal produced by the accelerometer or strain gage on the rear fork 6 or the like when the motorcycle is actually running on a test track, i.e., actual running data y(t) (which should preferably be an output signal value substantially immediately before suspension bottoming occurs), is converted from time-domain data into frequency-domain data by Fourier transformation in step S3. The result of the Fourier transformation is indicated by Y(f). After the step S3, the transfer function Ha(f) is multiplied by the output signal Y(f), providing a vibrating signal $X_{(0)}(f)$ in step S4. Then, the vibrating signal $X_{(0)}(f)$ is converted from frequency-domain data into time-domain data by inverse Fourier transformation, producing a vibrating signal $x_{(0)}(t)$ in step S5. The vibrating signal $x_{(0)}(t)$ produced in the step S5 is used as an initial value.

After the step S5, a vibrating signal $x_{(n)}(t)$ using the vibrating signal $x_{(0)}(t)$ as an initial value is supplied to the vibrator to vibrate the motorcycle. An output signal $y_{(n)}(t)$ from the accelerometer or the strain gage (i.e., the transducer) is measured and read in step S6. Then, the vibrating signal $x_{(n)}(t)$ is subjected to Fourier transformation, and the read output signal $y_{(n)}(t)$ is also subjected to Fourier transformation, providing respective results $X_{(n)}(f)$, $Y_{(n)}(f)$ in step S7. Then, the difference $|Y(f)|-|Y_{(n)}(f)|$ is calculated to obtain an error $E_{(n)}(f)$ in step S8. Therefore, the step S8 determines the error or difference between the distribution of the absolute value |Y(f)| of the output signal produced while the motorcycle is actually running and the distribution of the absolute value $|Y_{(n)}(f)|$ of the calculated output signal.

Figure 5:
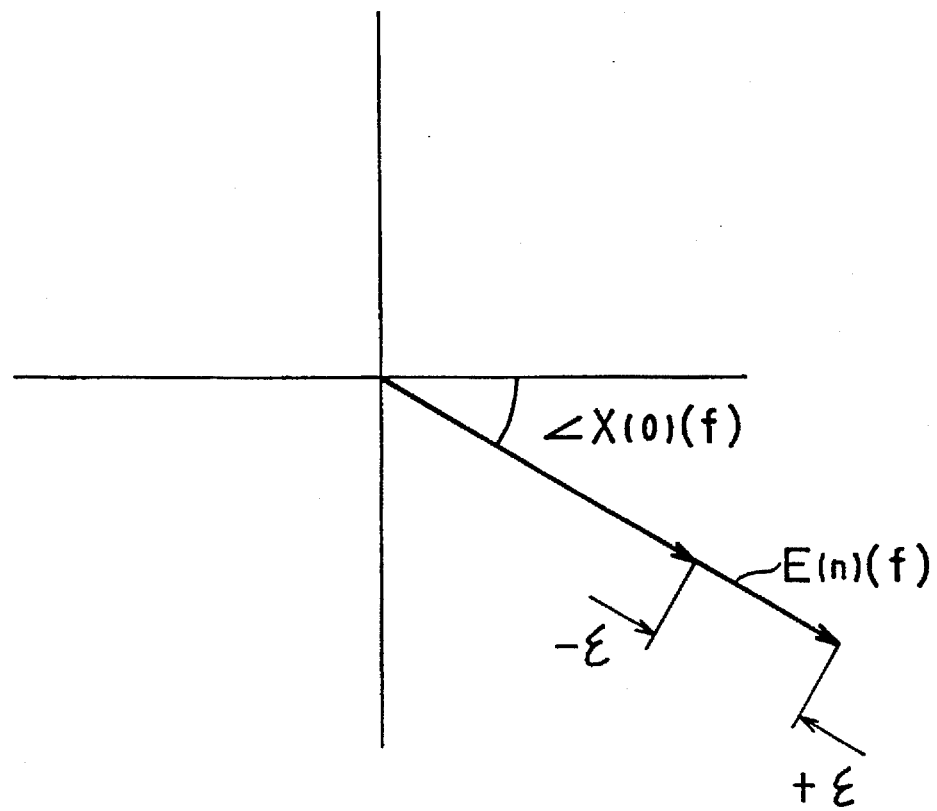
FIG. 5 is a diagram showing the amplitude of a Fourier spectrum.

The step S8 is followed by step S9 which determines whether the error $E_{(n)}(f)$ falls within a predetermined allowable error range ±ε. That is, the step S9 determines whether the distribution of the absolute value $|Y_{(n)}(f)|$ of the Fourier spectrum approximates the distribution of the absolute value |Y(f)| of the output signal produced while the motorcycle is actually running. If the error $E_{(n)}(f)$ is larger than the allowable error range ±ε in the step S9, then a step S10 carries out the calculation $[|X_{(n)}(f)|+E_{(n)}(f)\cdot|Ha(f)|]$, and sets a phase angle ∠X(0)(f) of the Fourier spectrum to $X_{(n+1)}(f)$. The symbol ∠ represents the phase angle of the Fourier spectrum. Therefore, the absolute value $|X_{(n)}(f)|$ of the amplitude of the Fourier spectrum of the vibrating signal $X_{(n)}(f)$ obtained in the step S7 is corrected by the product of the error $E_{(n)}(f)$ and the absolute value of the transfer function H(f) so that $|Y(f)|-|Y_{(n)}(f)|$ approaches or falls within the range below ±ε. The phase angle of the Fourier spectrum remains as the initial value. This condition is schematically shown in FIG. 5.

After the step S10, the phase angle $X_{(n+1)}(f)$ is converted back into a time-domain value $x_{(n+1)}(f)$ according to inverse Fourier transformation in step S11. Then, the number n is incremented by +1 in step S12. Thereafter, the steps S6 through S12 are repeated until the error $E_{(n)}(f)$ falls within the range ±ε. Since a signal produced by a Fourier transform of the output signal y(t) measured when the motorcycle is actually running is used as Y(f), the difference $|Y(f)|-|Y_{(n)}(f)|$ does not diverge, but necessarily converges into the range below ±ε. In the case where a signal produced by a Fourier transform of a signal generated immediately before suspension bottoming occurs is used as the output signal y(t), the time required for the difference $|Y(f)|-|Y_{(n)}(f)|$ to converge into the range below ±ε may be short.

If the error $E_{(n)}(f)$ falls within the range ±ε in the step S9, control goes from the step S9 to step S13 in which the output signal $Y_{(n)}(f)$ is measured with a noise group whose distribution of the absolute value of the Fourier spectrum is equal to $|X_{(n)}(f)|$, transfer functions are calculated from the measured result, and an arithmetic mean of the calculated transfer functions is determined to obtain a transfer function Gar(f).

That is, if the error $E_{(n)}(f)$ falls outside the allowable range, then $|X_{(n+1)}(f)|=|X_{(n)}(f)|+E_{(n)}(f)\cdot|Ha(f)|$, i.e., the sum of the absolute value $|X_{(n)}(f)|$ of the noise signal and the product of the absolute value of the value Ha(f) and the error $E_{(n)}(f)$, and the phase angle $\angle X_{(n+1)}=\angle X_{(0)}(f)$ are determined, and $E_{(n+1)}(f)$ is subjected to inverse Fourier transformation to determine a new noise signal for determining a distribution of the absolute value of the Fourier spectrum. The new noise signal is used as a vibrating signal $a=X_{(n+1)}(t)$, and the motorcycle is vibrated again with the noise signal $X_{(n+1)}(t)$. The above correcting process is repeated until the degree of approximation falls within a predetermined range. When the distribution of the absolute value $|Y_{(n)}(f)|$ of the Fourier spectrum of the output signal produced from the accelerometer or the strain gage when the motorcycle is vibrated by the vibrator falls within a predetermined range with respect to the distribution of the absolute value |Y(f)| of the Fourier spectrum of the output signal produced when the motorcycle is actually running, the distribution of the absolute value of the Fourier spectrum of the noise for measuring a transfer function at the time is determined. The motorcycle is vibrated a plurality of times with the noise group for measuring the transfer function to measure a transfer function Gb, and repeated corrective calculations are carried out in order to simulate actually running data on the vibrators based on the transfer function Gb. The distribution of the absolute value of the Fourier spectrum is a concept equivalent to a power spectrum distribution or a power spectrum density distribution. The power spectrum distribution or the power spectrum density distribution may be used instead of the distribution of the absolute value of the Fourier spectrum.

When the distribution of the absolute value of the Fourier spectrum of the output signal produced from the accelerometer or the strain gage when the motorcycle is vibrated by the vibrator falls within a predetermined range with respect to the power spectrum density distribution produced when the motorcycle is actually running, levels depending on the respective frequencies of the noise for measuring the transfer function are determined, and the motorcycle is vibrated a plurality of times with the noise group for measuring the transfer function, thus calculating a transfer function Gar.

Figure 6:
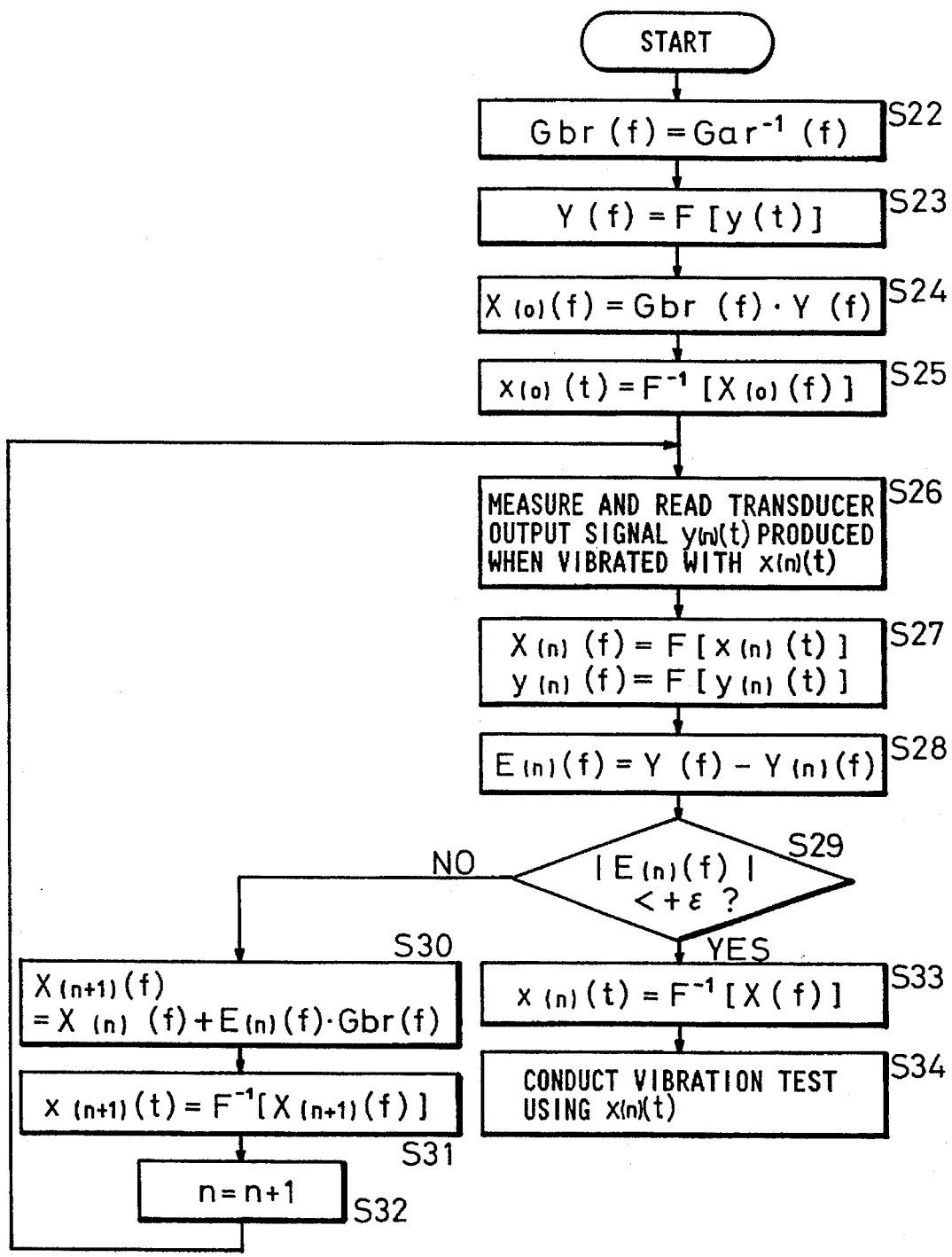
FIG. 6 is a flowchart of a process for determining a vibrating signal x(t) using a transfer function that is determined according to the method of the present invention.

The vibrating signal is calculated while the phase angle $\angle X_{(n)}(f)$ of the Fourier spectrum is being fixed to $\angle X_{(0)}(f)$ in the above process. After the step S13, as is known in the art, the phase angle $\angle X_{(n)}(f)$ of the Fourier spectrum is generated as a group of phase angles irregularly distributed in a range of from $-\pi$ to $\pi$ with respect to the respective frequencies of a desired frequency range, according to a routine for producing random numbers, and the motorcycle is vibrated in a test using the noise group thus obtained, thereby determining the transfer function Gar(f) including phase angles. Using the transfer function thus determined, as shown in FIG. 6, an inverse function Gbr(f) of the transfer function Gar(f) is determined, and an output signal y(t) produced when the motorcycle is vibrated is converted into an output signal Y(f) by Fourier transformation. The transfer function Gbr(f) is multiplied by the output signal Y(f) to provide a vibrating signal $X_{(0)}(f)$, which is subjected to inverse Fourier transformation to obtain an initial value $x_{(0)}(t)$ for the vibrating signal (see steps S22~S25).

Then, repeated corrective calculations are effected. That is, a transducer output signal $y_{(n)}(t)$ produced when the motorcycle is vibrated with a signal $x_{(n)}(t)$ using the vibrating signal $x_{(0)}(t)$ as an initial value is read, and an error $E_{(n)}(f)$ [$=Y(f)=Y_{(n)}(f)$] is calculated using Fourier transform signals $X_{(n)}(f)$, $Y_{(n)}(f)$ of the vibrating signal $x_{(n)}(t)$ and the output signal $y_{(n)}(t)$, respectively (see steps S26~S28). The vibrating test and corrective calculations according to $[X_{(n)}(f)+E_{(n)}(f)\cdot Gbr(f)]$ for reducing the error are repeated until the absolute value of the error $E_{(n)}(f)$ becomes smaller than a predetermined error $\epsilon$ (see steps S26~S32). A vibrating signal $x_{(n)}(t)$ is determined when the error $E_{(n)}(f)$ becomes smaller than the allowable error $\epsilon$. When the motorcycle is vibrated with the vibrating signal, the load of a target value can be imposed on the motorcycle.

In the above vibration control process, the same degree of suspension bottoming as that which is experienced while the motorcycle is actually running is produced, a transfer function is determined at the time the suspension bottoming is caused, and repeated corrective calculations are effected based on the determined transfer function. Therefore, the motorcycle can be vibrated with a load which approximates the load which would be applied from an actual road even if the suspension of the motorcycle has a nonlinear response.

The above vibration control process has been described with respect to a single-axis vibrating system. Actually, however, the motorcycle is vibrated in a three-axis vibrating system using the first, second, and third vibrators 14, 15, 16 as shown in FIG. 1. The multi-axis vibrating system is required to take into account a crosstalk between channels.

For example, in a three-axis vibrating system, since the transfer function Gar(f) is obtained with respect to each of the three axes, and there is a crosstalk between the axes Gar, the transfer function Gar(f) due to the crosstalk can be determined in the manner described above. If the elements of the transfer function Gar(f) are represented by Gmn, then the character "m" indicates the vibrator number and "n" the transducer number. A matrix representation is produced as follows: In the case of the three-axis vibrating system, the first vibrator 14 is solely vibrated in several tests, and the output signals from the transducers (i.e., the accelerometers mounted on the rear fork 6 and the suspension 3 and the strain gage attached to the suspension 3) are measured to obtain transfer functions G11, G12, G13. Then, the same measurements are made with respect to the second and third vibrators 15, 16. A target signal Y(f) with respect to a vibrating signal X(f) is obtained in the form of a 3×3 transfer function matrix as shown in FIG. 7. As indicated by the 3×3 transfer function matrix, the output signal Y1 of the transducer 1 (i.e., the accelerator mounted on the rear fork 6) is expressed by:

$$Y1=G11X1+G21X2+G31X3.$$

The vibrating signal X(f) with respect to the output signal Y(f) is given as shown in FIG. 8, where $[G]^{-1}$ indicates an inverse matrix. The equation shown in FIG. 8 is a fundamental equation with respect to the three-axis vibrating system. A vibrating signal can be generated based on the equation shown in FIG. 8, and the motorcycle as it runs actually can be simulated when it is vibrated with the vibrating signal.

Using a transfer function Gar(f) which is an inverse Fourier transform of the transfer function Gar(f) thus obtained, vibration tests corresponding to various running modes are conducted.

In the above vibration control process, the same level of suspension bottoming as that which occurs when the motorcycle is actually running is produced, a transfer function is determining using the output signal y(t) produced when the suspension bottoming is caused, and repeated corrective calculations are made based on the determined transfer function. Accordingly, the motorcycle can be vibrated with a load close to the actual load that would be applied from an actual road even when the motorcycle has a nonlinear response system such as a front fork.

In the above first embodiment, the motorcycle is vibrated by the vibrating system. However, any of various other motor vehicles such as a three-wheel motor vehicle, a four-wheel motor vehicle, or the like may be vibrated by the vibrating system. The present invention is also applicable to various vibrating systems other than those for motor vehicles.

As described above, in calculations for a transfer function to be used when a motor vehicle is forcibly vibrated, since a test signal calculated using an output signal from a transducer that is measured while the motor vehicle is actually running is used as an initial value, a signal [|Y(f)|−|$Y_{(n)}$(f)|] in the calculations for a transfer function does not diverse, but converges of necessity.

When a transfer function Gar(f) is determined using a signal produced by multiplying an inverse function $Gb^{-1}(f)$ by a safety coefficient, a vibrating signal $x_{(0)}(t)$ is calculated to be of a relatively small value, preventing the motor vehicle from being subjected to a large load in test.

Since a transfer function is calculated using a transducer output signal measured when the motor vehicle is actually running immediately prior to suspension bottoming, the signal [|Y(f)|−|$Y_{(n)}$(f)|] converges quickly in the calculations for the transfer function.

In the above first embodiment, the third vibrator 16 is connected to the vibrating rod 20 through the swing plate 18 so that the axis of the third vibrator 16 is directed vertically. However, the swing plate 18 may be dispensed with, and the third vibrator 16 may be directly connected to the vibrating rod 20 so that the axis of the third vibrator 16 is directed horizontally.

While the front and rear axles 2, 5 are directly vibrated by the first, second, and third vibrators 14, 15, 16 in the first embodiment, the front and rear axles 2, 5 may be vibrated through a relatively rigid member such as a wheel, hub, or the like.

In the first embodiment, the rear axle 5 is supported by the reactive jig 25, and the front axle 2 is vibrated back and forth horizontally by the third vibrator 16. However, the front axle 2 may be supported by a reactive jig, and the rear axle 5 may be vibrated back and forth horizontally.

According to the first embodiment, inasmuch as the axles are directly vibrated by the vibrators without any wheels interposed, the load which would be applied from an actual road can accurately be simulated without suffering an error element such as air in tires which would otherwise be present in the transmission path from the tires to the axles.

Since one of the front and rear axles 2, 5 is vibrated back and forth horizontally by the third vibrator 16, the load (particularly the back-and-forth tensile or compressive load) imposed from an actual road on the suspension 3 of the motor vehicle can accurately be simulated which would otherwise not be obtained if the axles were vibrated only vertically.

The third vibrator 16 is controlled in combination with the first and second vibrators 14, 15 so that the load applied to the vibrating rod 20 coupled to the third vibrator 16 will be constant. Such a controlling arrangement results in a compensating process to cancel out an undesirable back-and-forth compressive load which is produced when the motorcycle is vertically vibrated by the first and second vibrators 14, 15, because of the link mechanism that limits the rear axle against back-and-forth movement. As a consequence, displacements of the third vibrator 16 in combination of displacements of the first and second vibrators 14, 15 for making constant the load on the vibrating rod 20 are stored as a map. When the third vibrator 16 is actuated according to the stored map, the first, second, and third vibrators 14, 15, 16 can be controlled in displacement without producing an excessively large load in the back-and-forth direction. Inasmuch as the displacement control allows a much higher control process than the load control, it allows the vibrating system to simulate the load which would be applied from an actual road to the motorcycle.

Figure 9:
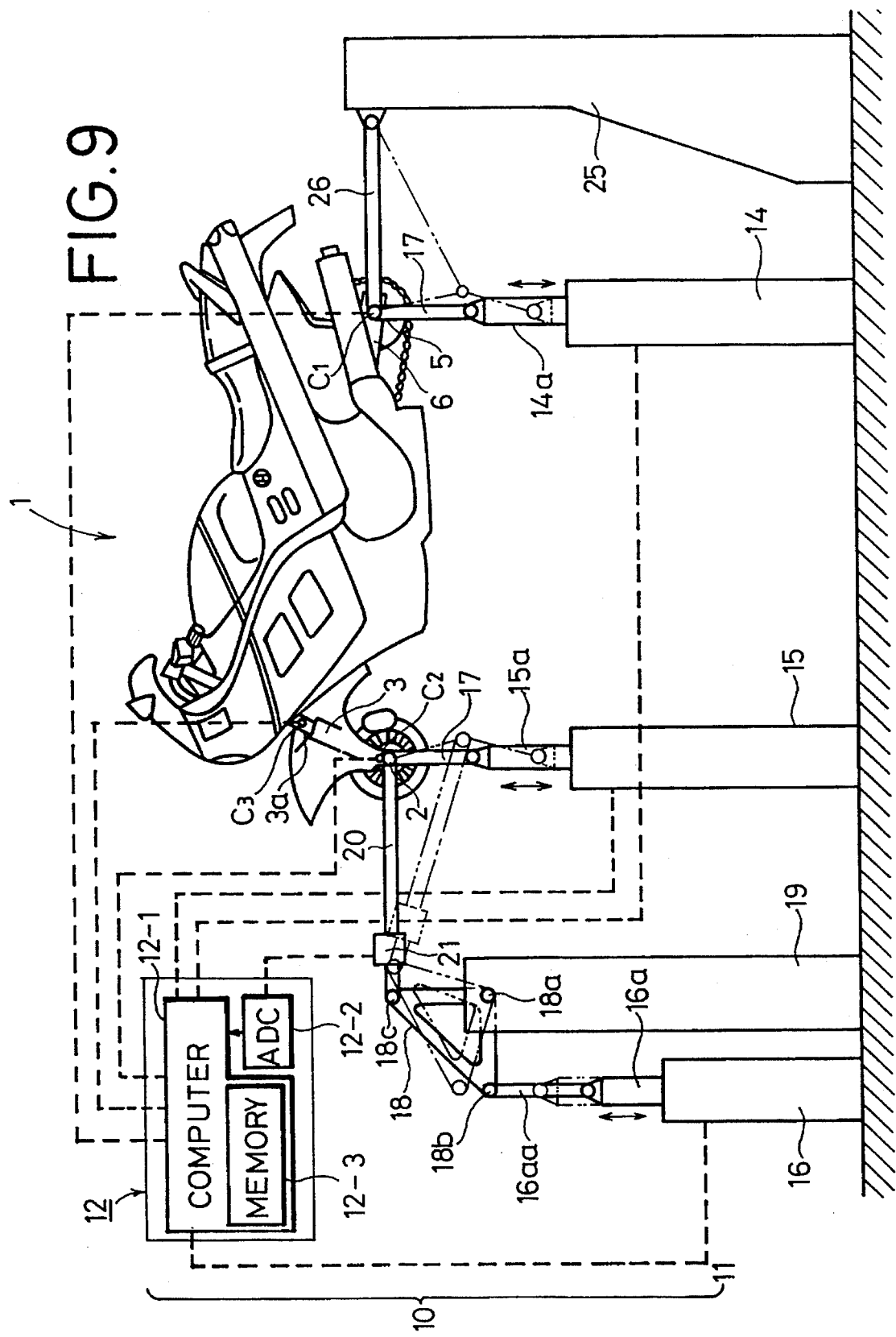
FIG. 9 is a side elevational view, partly in block form, a motor vehicle vibrating system according to a second embodiment of the present invention.

A motor vehicle vibrating system according to a second embodiment of the present invention will be described below with reference to FIG. 9.

An object to be vibrated by the motor vehicle vibrating system according to the second embodiment is a motorcycle. Those parts of the motor vehicle vibrating system according to the second embodiment which are identical to those of the first embodiment are denoted by identical reference characters.

According to the second embodiment, an end of 18b of a swing plate 18 is connected by a pin to the distal end of a piston rod 16a of a third vibrator 16 through a link 16aa. The swing plate 18 is of a substantially triangular shape as viewed in side elevation, and a central corner 18a thereof is angularly movably supported on an upper end portion of a support column 19. The other end 18c of the swing plate 18 is coupled by a pin to an end of a vibrating rod 20 which extends substantially horizontally, and the other end of the vibrating rod 20 is coupled to a front axle 2 of a motorcycle 1 by a pin.

When the piston rod 16a of the third vibrator 16 is vertically extended and contracted, it causes the swing plate 18a and the vibrating rod 20 to vibrate the front axle 2 back and forth in the horizontal direction. The vibrating rod 20 is combined with a load detector 21. The load detector 20 is positioned remotely from the motorcycle (i.e., closely to the swing plate 18) so that it is as free from vibrations as possible when the motorcycle 1 is vibrated.

In the second embodiment, the map shown in FIG. 2 is produced for displacements of the third vibrator 16, and the third vibrator 16 is started and stopped according to the map.

A method of controlling the motor vehicle vibrating system according to the second embodiment is the same as the method for the motor vehicle vibrating system according to the first embodiment.

In the second embodiment, the third vibrator 16 is connected to the vibrating rod 20 through the link 16aa and the swing plate 18 so that the axis of the third vibrator 16 is directed vertically. However, the swing plate 18 may be dispensed with, and the third vibrator 16 may be directly connected to the vibrating rod 20 so that the axis of the third vibrator 16 is directed horizontally.

Mechanical structural details of a motor vehicle vibrating system according to a third embodiment of the present invention will be described below with reference to FIGS. 10 through 13.

According to the third embodiment, spacers 34 (see FIGS. 10 and 11) are disposed around the rear axle 5 inwardly of rear fork members 6 extending from the motorcycle frame. A vibrating point P where vibrations are applied is positioned in a substantially central portion of the rear axle 5.

Figure 10:
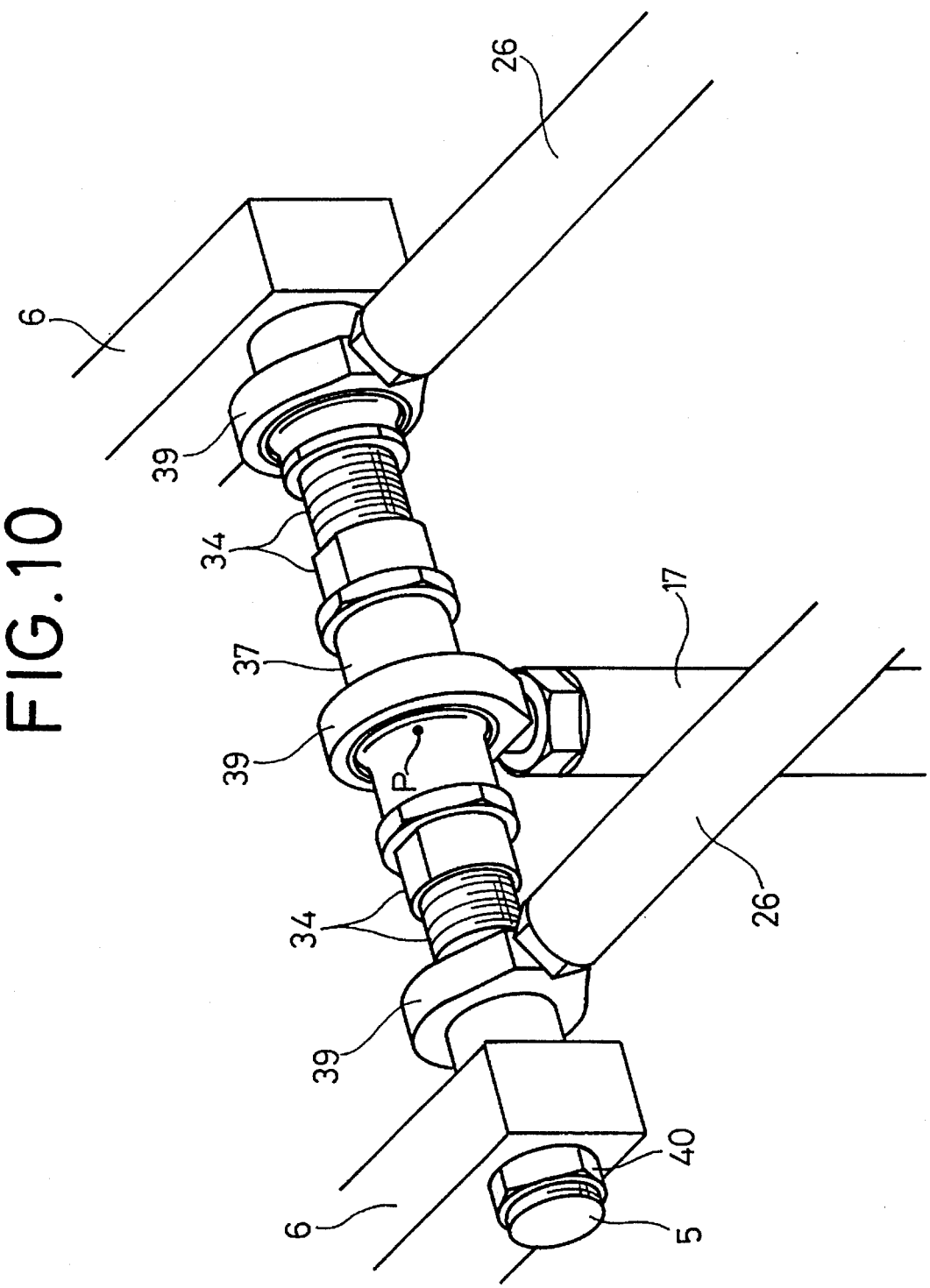
FIG. 10 is a fragmentary perspective view of a vibrating structure for a front portion of a motor vehicle in a motor vehicle vibrating system according to a third embodiment of the present invention.
Figure 11:
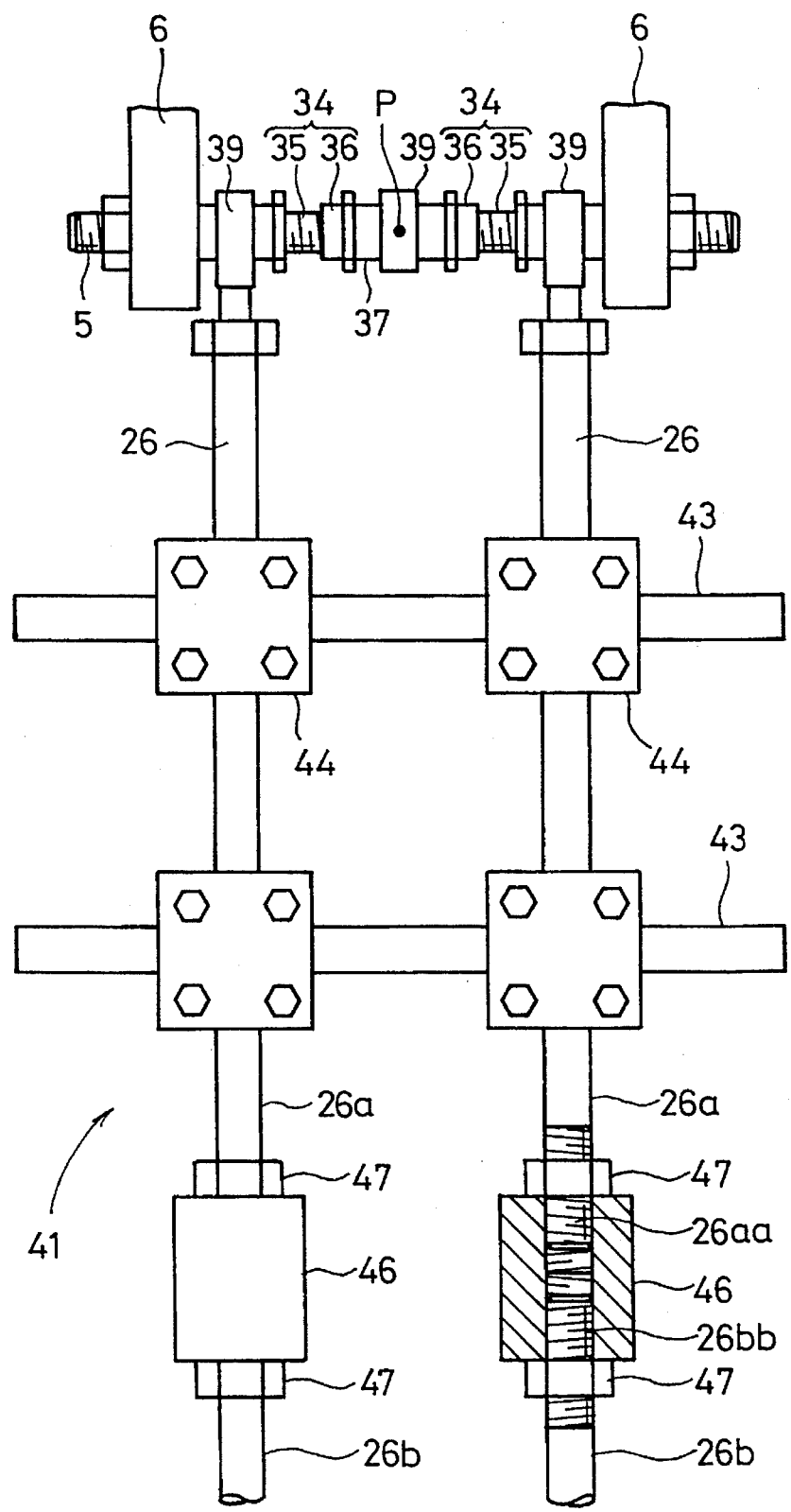
FIG. 11 is a plan view of the vibrating structure in the motor vehicle vibrating system according to the third embodiment.
Figure 12:
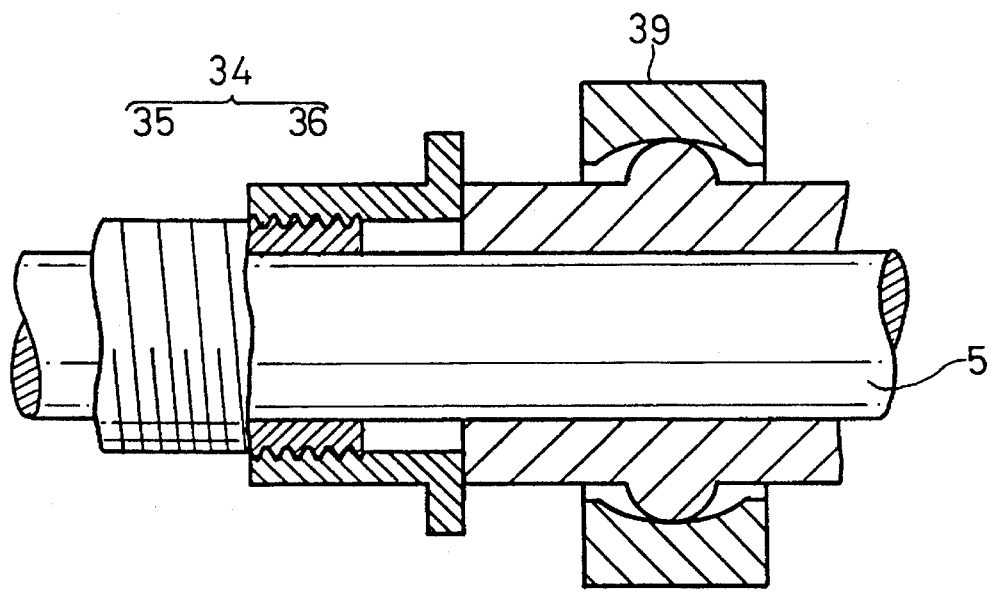
FIG. 12 is a fragmentary cross-sectional view of a rear axle in the motor vehicle vibrating system according to the third embodiment.

As shown in FIGS. 10 and 11, each of the spacers 34 comprises a hollow bolt 35 fitted over the rear axle 5 and a nut 36 threaded over the bolt 35. The length of each spacer 34 can be adjusted by relatively rotating the bolt 35 and the nut 36. The lengths of the respective spacers 34 are adjusted to position the vibrating point P substantially centrally on the rear axle 5. A tubular coupling member 37 is fitted over the rear axle 5 between the spacers 34, and the distal end of a connecting rod 17 extending from the first vibrator 14 is supported through spherical surfaces on the center of the coupling member 37 by a joint 39. Nuts 40 are threaded over opposite ends of the rear axle 5 which project outwardly from the rear fork members 6, thereby fixing the rear axle 5 to the rear fork members 6.

In the third embodiment, the rear axle 5 is supported by the reactive jig 25 through a link mechanism 41 so that the rear axle 5 is limited against back-and-forth horizontal movement, as with the second embodiment. Furthermore, as shown in FIG. 11, the link mechanism 41 comprises two parallel link arms 26 spaced transversely from each other, and two parallel cross members 43 interconnecting the link arms 26. The link arms 26 and the cross members 43 are connected to each other by couplings 44, making the overall link mechanism 41 highly rigid. The link arms 26 have ends coupled to the rear axle 5 through joints 39 at positions inward of the rear fork members 6.

Figure 13:
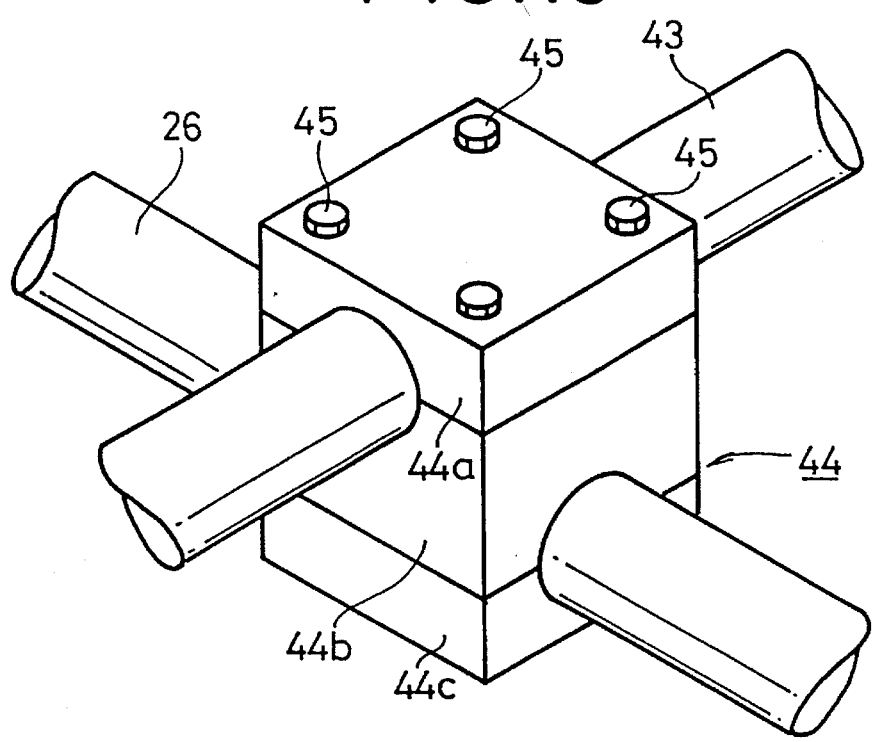
FIG. 13 is a fragmentary perspective view of a joint structure by which a link arm and a cross member are joined to each other in the motor vehicle vibrating system according to the third embodiment.

As shown in FIG. 13, each of the couplings 44 comprise a vertical stack of three members 44a, 44b, 44c between which the link arm 26 and the cross member 43 are clamped and fastened by bolts 45. The three members 44a, 44b, 44c have arcuate grooves defined in their lower or upper surface or both and complementary in shape to the link arm 26 and the cross member 43, which are snugly received in those arcuate grooves for secure connection.

The transversely spaced link arms 26 are adjustable in their relative length. More specifically, as shown in FIG. 11, each of the link arms 26 comprises a first arm 26a and a second arm 26b which are coaxial with each other and interconnected by a nut 46 threaded over externally threaded ends 26aa, 26bb of the first and second arms 26a, 26b. The externally threaded ends 26aa, 26bb have threads cut in opposite directions. When the nut 46 is turned in one direction or the other, the first and second arms 26a, 26b are coaxially movable toward or away from each other, thus adjusting the overall length of the link arm 26. Nuts 47 are also threaded over the externally threaded ends 26aa, 26bb and held against opposite ends of the nut 46 for preventing the nut 46 from loosening.

In the third embodiment, the vibrating point P is positioned substantially centrally on the rear axle 5 for vibrating a central portion of the rear axle 5. Therefore, it is possible to prevent the motorcycle from swinging laterally when it is vibrated though the motorcycle would otherwise tend to swing laterally due to its own structural features, i.e., a smaller width than three- or four-wheel motor vehicles such as automobiles. In addition, the vibrating rod is also prevented from engaging another component such as a muffler located in the vicinity of the rear axle when the motorcycle swings laterally as it is vibrated.

In the third embodiment, the link mechanism 41 for vibrating the rear axle 5 is composed of the laterally spaced link arms 26 and the cross members 43 that interconnect the link arms 26, whereby it can vibrate the rear axle 5 without causing the motorcycle itself to swing laterally. Consequently, an undue load will not be imposed on the motorcycle frame when the rear axle 5 is vibrated.

Furthermore, strain gages are attached to laterally spaced suspension members 3 by which the front axle 2 is supported. When the lengths of the link arms 26 are adjusted before the application of vibrations, they may be adjusted to equalize loads applied to the suspension members 3 while the loads are being checked by the strain gages. With the lengths of the link arms 26 having been thus adjusted, the link arms 26 can rigidly be connected to each other by the cross members 43 to support the link mechanism 41 in good lateral balance for better protection against lateral swinging movement of the motorcycle.

Additionally, as with the first embodiment, the third vibrator 16 is controlled in combination with the first and second vibrators 14, 15 so that the load applied to the vibrating rod 20 coupled to the third vibrator 16 will be constant. Such a controlling arrangement results in a compensating process to cancel out undesirable back-and-forth compressive and tensile loads which are produced when the motorcycle is vertically vibrated by the first and second vibrators 14, 15, because of the link mechanism that limits the rear axle against back-and-forth movement. As a consequence, displacements of the third vibrator 16 in combination with displacements of the first and second vibrators 14, 15 for making constant the load on the vibrating rod 20 are stored as a map. When the third vibrator 16 is actuated according to the stored map, the first, second, and third vibrators 14, 15, 16 can be controlled in displacement without producing an excessively large load in the back-and-forth direction. Inasmuch as the displacement control allows a much higher control process than the load control, it allows the vibrating system to simulate the load which would be applied from an actual road to the motorcycle.

Figure 14:
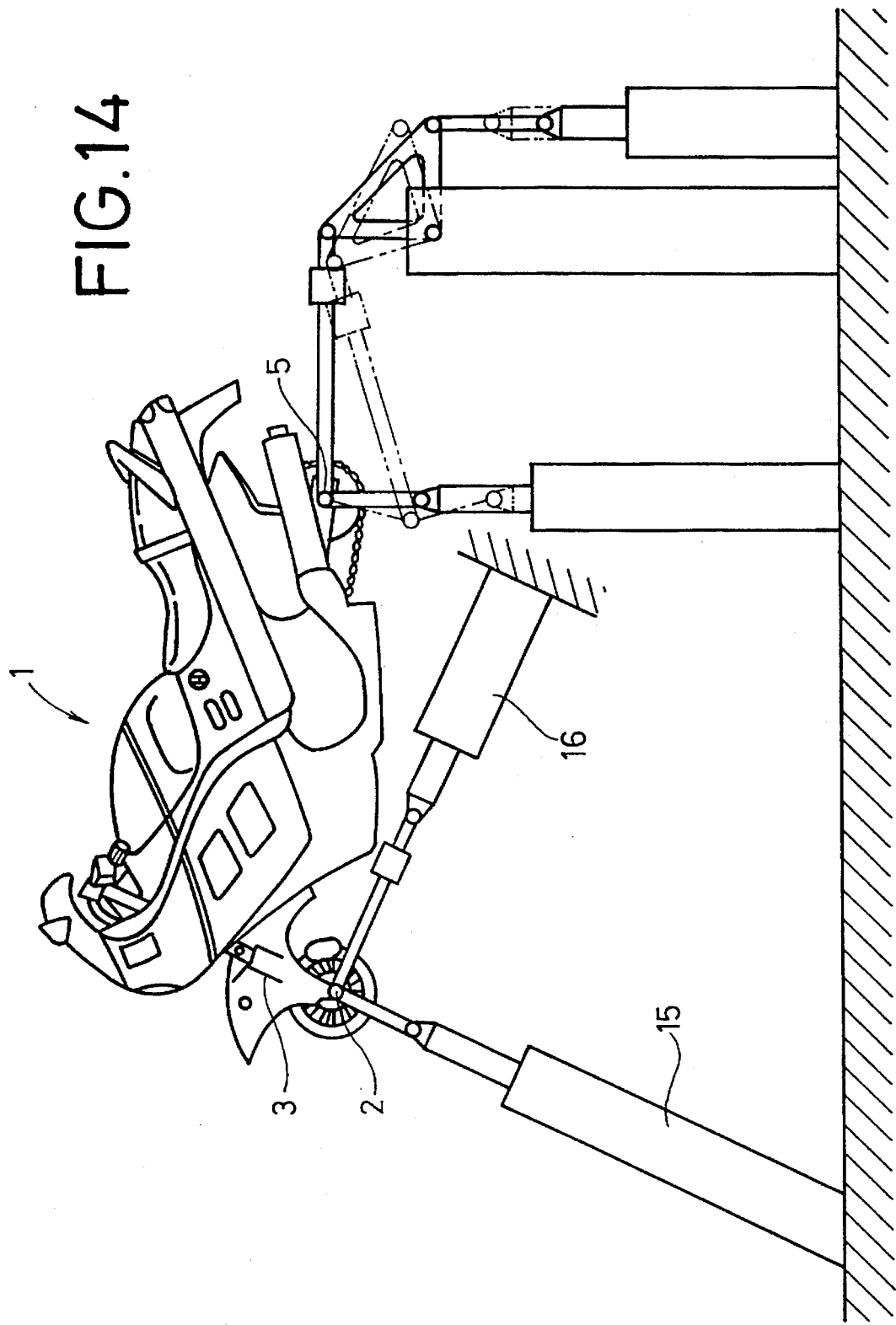
FIG. 14 is a side elevational view of a vibrating structure for a front portion of a motor vehicle in a motor vehicle vibrating system according to a fourth embodiment of the present invention.

FIG. 14 shows a motor vehicle vibrating system according to a fourth embodiment of the present invention. According to the fourth embodiment, the front axle 2 is vibrated in two mutually perpendicular directions by second and third vibrators 15, 16, as with the second embodiment. Specifically in the fourth embodiment, the front axle 2 is vibrated by the second vibrator 15 in the longitudinal direction of the suspension 3, and by the third vibrator 16 in the direction perpendicular to the longitudinal direction of the suspension 3.

When the front axle 2 is vertically vibrated, since it is vibrated in the longitudinal direction of the suspension 3, the front axle 2 moves up and down as well as back and forth substantially horizontally. When the rear axle 5 is vibrated, it is required to move back and forth to cancel out the back-and-forth movement of the front axle 2. To meet this requirement, the rear axle 5 is vibrated by an axle vibrating device which is identical to the axle vibrating device that is used to vibrate the front axle 2 shown in FIG. 9.

In the fourth embodiment, excessive compressive or tensile forces can be applied without imposing undue bending forces on the suspension 3. Although the front axle 2 is vibrated in the longitudinal direction of the suspension 3 by the second vibrator 15, it may be vibrated in a direction slightly deviating from the longitudinal direction of the suspension 3.

While the front and rear axles 2, 5 are directly vibrated by the first, second, and third vibrators 14, 15, 16 in the second through fourth embodiments, the front and rear axles 2, 5 may be vibrated through a relatively rigid member such as a wheel, hub, or the like.

Figure 15:
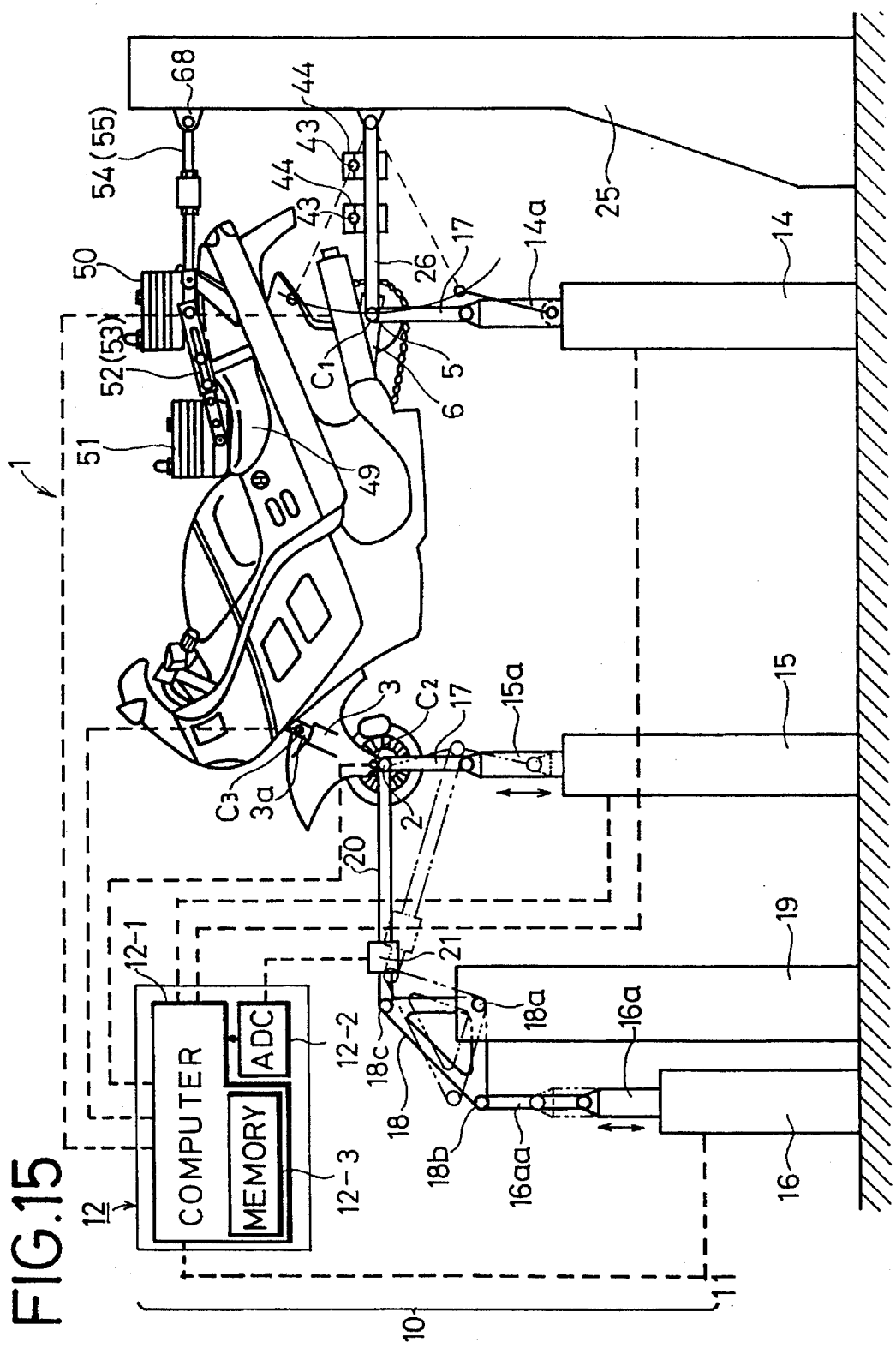
FIG. 15 is a side elevational view, partly in block form, a motor vehicle vibrating system according to a fifth embodiment of the present invention.

A motor vehicle vibrating system according to a fifth embodiment of the present invention will be described below with reference to FIG. 15. In FIG. 15, the motor vehicle vibrating system is shown as being applied to a system for performing road simulations for motorcycles, the motor vehicle vibrating system having a rider weight applying structure.

A motorcycle, generally denoted at 1, which is to be vibrated by the vibrating system, has front and rear wheels removed. The motorcycle 1 has a front axle 2 rotatably supported on a motorcycle frame (not shown) through a telescopic suspension 3, and a rear axle 5 mounted on a rear fork 6 that is swingably supported on a rear cushion (not shown) combined with a link mechanism.

The motor vehicle vibrating system includes an axle vibrating device 10 for directly vibrating the front and rear axles 2, 5 of the motorcycle 1. The axle vibrating device 10 comprises a mechanical assembly 11 for actually vibrating the front and rear axles 2, 5 and a controller 12 for controlling the mechanical assembly 11.

The mechanical assembly 11 comprises a first vibrator 14 for vertically vibrating the rear axle 5, a second vibrator 15 for vertically vibrating the front axle 2, and a third vibrator 16 for vibrating the front axle 2 back and forth in the longitudinal direction of the motorcycle 1. The vibrators 14, 15, 16 comprise respective double-acting hydraulic cylinders capable of applying both tensile and compressive forces.

The first and second vibrators 14, 15 have respective piston rods 14a, 15a whose distal ends are coupled to connecting rods 17, respectively, through pins. The connecting rods 17 have ends connected to the respective axles 2, 5 by pins remotely from the piston rods 14a, 15a. The third vibrator 16 has a piston rod 16a whose end is coupled to an end 18b of a swing plate 18 through a link 16aa by a pin. The swing plate 18 is substantially in the shape of a triangle as viewed in side elevation. The swing plate 18 has a central corner 18a swingably supported on an upper end portion of a support column 19. The swing plate 18 also has an end 18c coupled to an end of a substantially horizontally extending vibrating rod 20 by a pin. The other end of the vibrating rod 20 is coupled to the front axle 2 by a pin.

When the piston rod 16a of the third vibrator 16 is vertically extended or contracted, the swing plate 18 is angularly moved about the central corner 18a thereby to move the vibrating rod 20 horizontally, thus vibrating the front axle 2 back and forth horizontally. The vibrating rod 20 is combined with a load detector 21 mounted thereon. The load detector 20 is positioned remotely from the motorcycle (i.e., closely to the swing plate 18) so that it is as free from vibrations as possible when the motorcycle 1 is vibrated.

A rigid reactive jig 25 for limiting the back-and-forth horizontal movement of the motorcycle 1 is coupled to the rear axle 5 through parallel link arms 26 of a link mechanism which is identical in structure to the link mechanism 41 shown in FIGS. 10 through 13.

Figure 18:
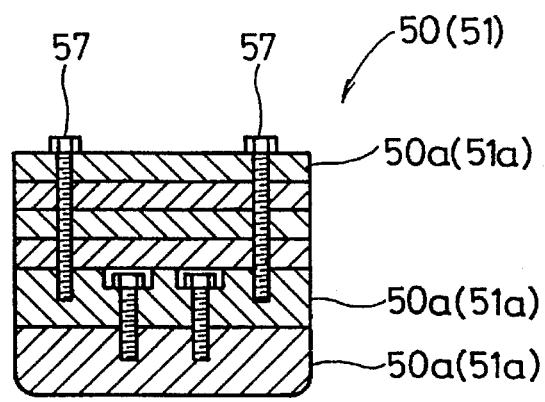
FIG. 18 is a cross-sectional view taken along line XVIII—XVIII of FIG. 16.
Figure 4:
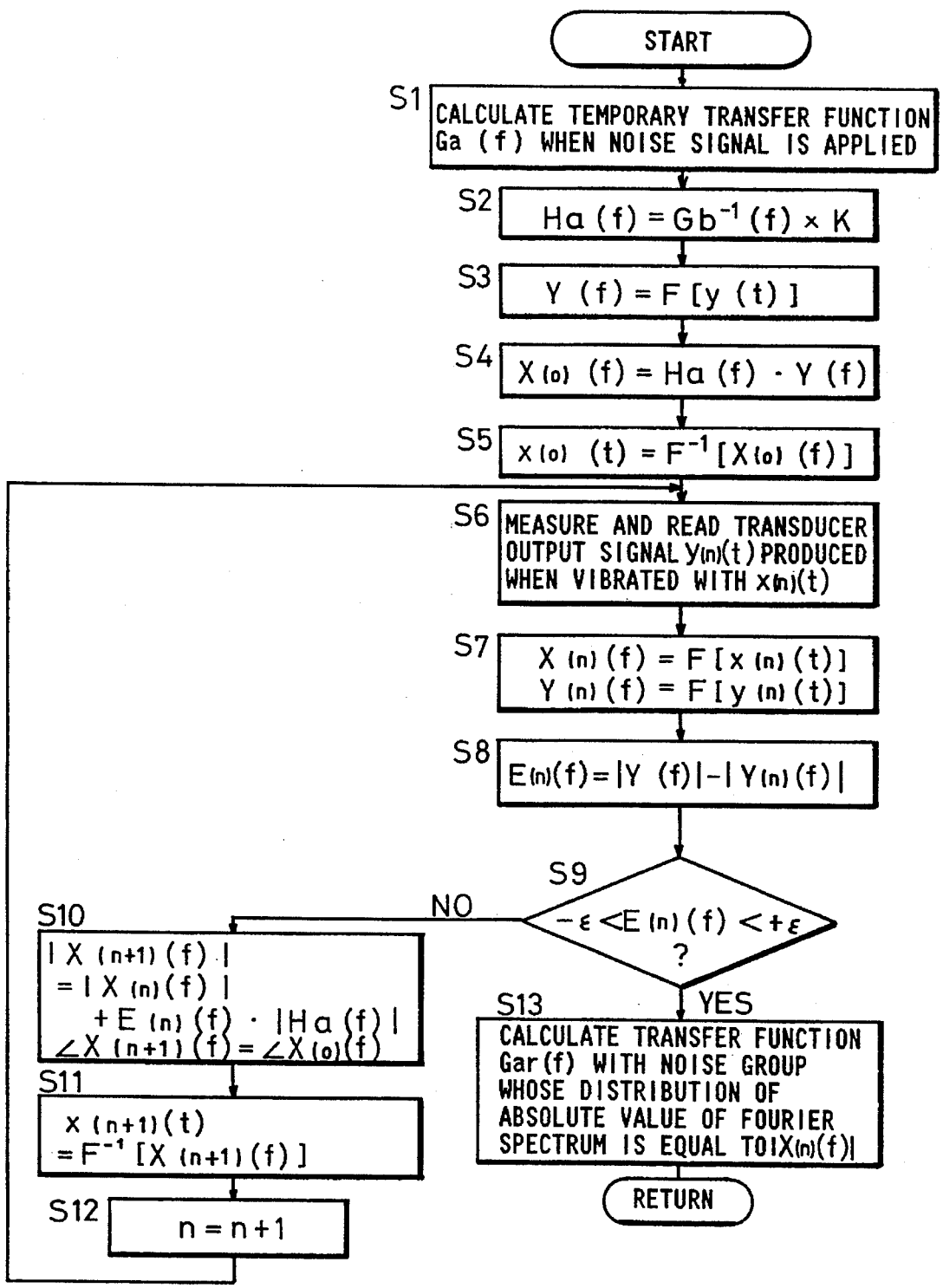
FIG. 4 is a flowchart of a method of controlling a motor vehicle vibrating system according to the present invention.
Figure 16:
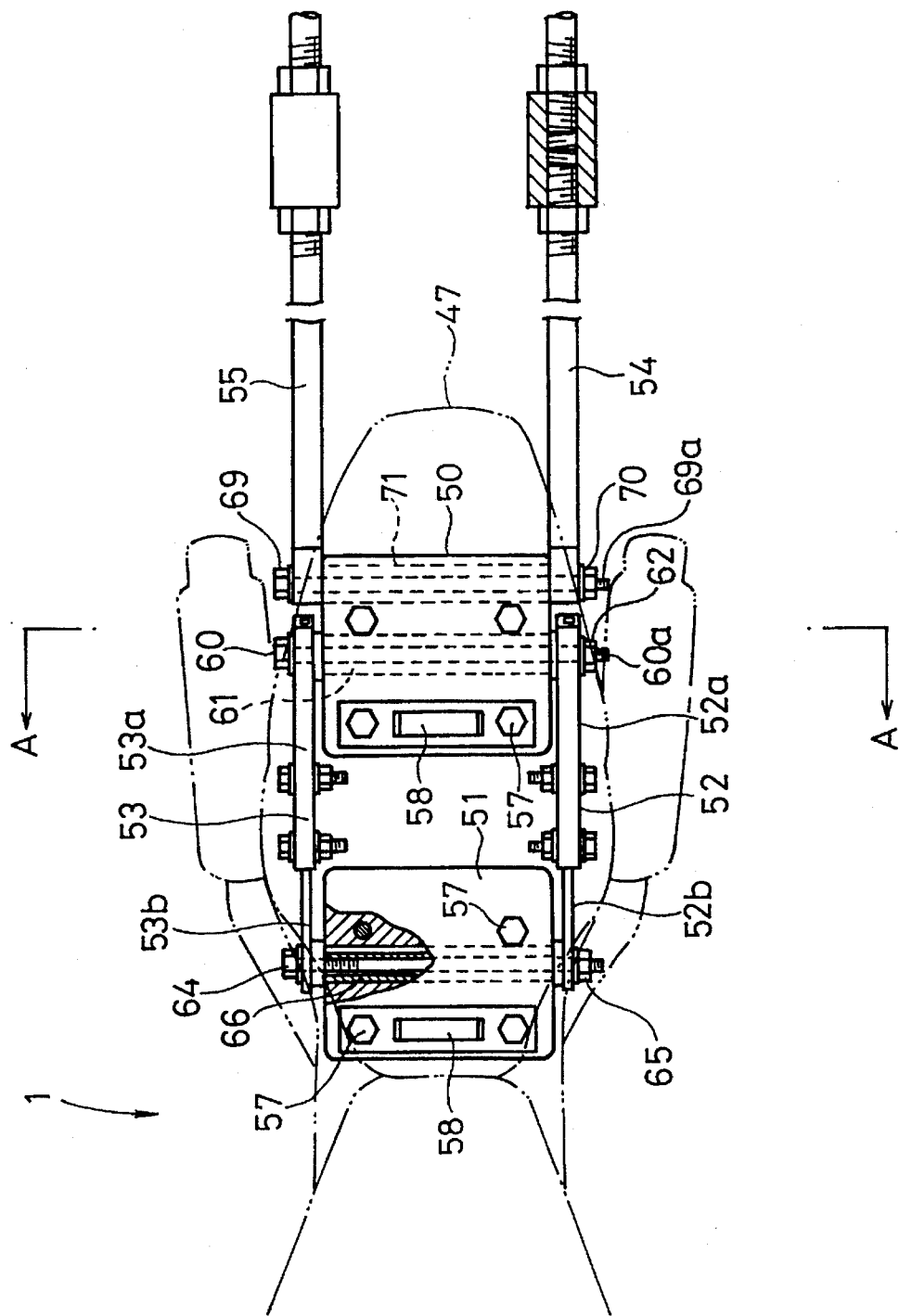
FIG. 16 is a plan view of a rider weight applying structure to be placed on a seat in the motor vehicle vibrating system according to the fifth embodiment.
Figure 17:
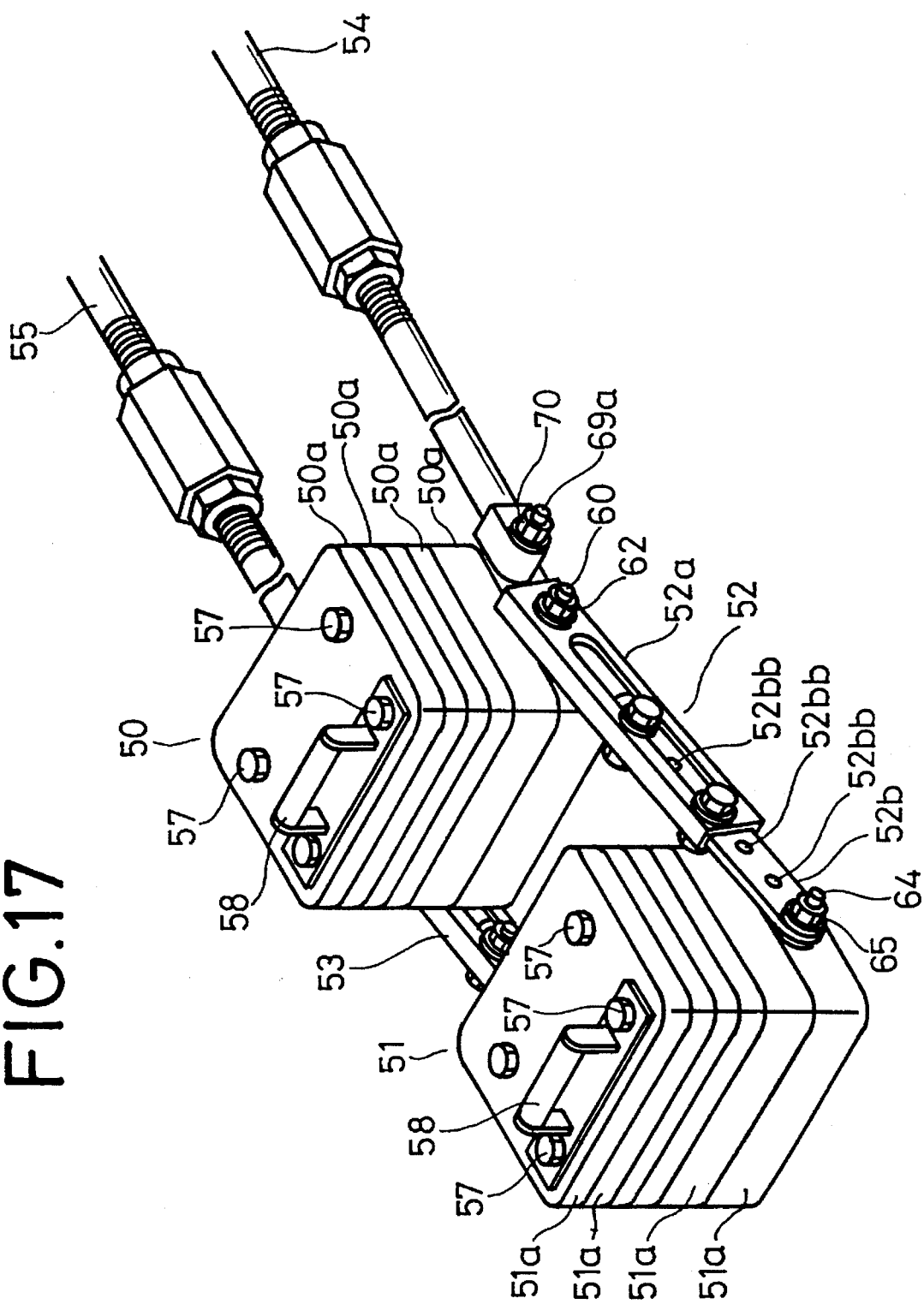
FIG. 17 is a perspective view of the rider weight applying structure shown in FIG. 16.

According to the fifth embodiment, as shown in FIGS. 16 through 18, a first rear weight 50 corresponding to the weight of a passenger and a second front weight 51 corresponding to a driver are mounted on a seat 49 of the motorcycle 1 at positions that are spaced from each other in the longitudinal direction of the motorcycle 1. The weights 50, 51 are operatively coupled to each other by transversely spaced parallel link arms 52, 53 such that the weights 50, 51 are vertically movable but transversely immovable. The rear weight 50 is supported on transversely spaced parallel link arms 54, 55 extending forwardly from an upper portion of the reactive jig 25 such that the weight 50 is vertically movable but transversely immovable.

The first and second weights 50, 51 comprise respective vertical stacks of weight pieces 50a, 51a, respectively, which are interconnected by bolts 57 extending through the corners of the weight pieces 50a, 51a. The weights 50, 51 can be adjusted in weight by varying the number of weight pieces 50a, 51a that are stacked. The weights 50, 51 have carrying handles 58 attached to the uppermost weight pieces 50a, 51a, respectively.

A rod 60 with an externally threaded end 60a is laterally inserted through a lowermost one of the weight pieces 50a of the first weight 50. An annular spacer 61 is fitted over the rod 60 in the weight 50. The parallel link arms 52, 53 have ends fitted over the opposite ends of the rod 60 and held against the opposite ends of the spacer 61, and a nut 62 is threaded over the externally threaded end 60a fastening the parallel link arms 52, 53 to the first weight 50. The other ends of the parallel link arms 52, 53 are fitted over the opposite ends of a rod 64 which is laterally inserted through a lowermost one of the weight pieces 51a of the second weight 51. An annular spacer 66 is also fitted over the rod 64 in the weight 51. The rod 64 has an externally threaded end over which a nut 65 is threaded, fastening the parallel link arms 52, 53 to the second weight 51. The rods 60, 64 extend substantially centrally through the respective first and second weights 50, 51.

The parallel link arms 52, 53 are identical in structure to each other, and adjustable in length. More specifically, as shown in FIG. 17, the link arms 52, 53 comprise respective female arms 52a, 53a of channel-shaped cross section, and respective male arms 52b, 53b slidably fitted in the female arms 52a, 53a, respectively. The male arms 52b, 53b have holes 52bb, 53bb defined therein and spaced at equal intervals in the longitudinal direction thereof. Bolts are inserted through selected two of the holes 52bb, 53bb and slots defined in the female arms 52a, 53a, and nuts are threaded over the respective bolts, thus interconnecting the female arms 52b, 53b and the male arms 52a, 53a. By selecting holes 52bb, 53bb into which the bolts are to be inserted, the length of the parallel link arms 52, 53 can be adjusted.

As shown in FIG. 15, two brackets 68 are mounted on the upper portion of the reactive jig 25, the brackets 68 being laterally spaced from each other by a distance which is substantially the same as the width of the weights 50, 51. The link arms 54, 55 have ends vertically swingably coupled to the brackets 68, respectively. The other ends of the link arms 54, 55 are angularly movably connected to opposite ends of a rod 69 which extends laterally through the lowermost weight piece 60a of the rear weight 50. The rod 69 has an externally threaded end 69a over which a nut 70 is threaded, thus connecting the link arms 54, 55 to the rear weight 50. An annular spacer 71 is fitted over the rod 69 in the weight 50.

Figure 19:
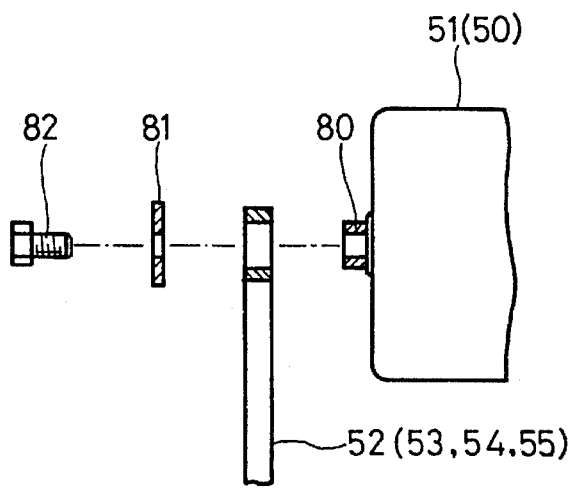
FIG. 19 is an exploded view of another structure by which a weight to be placed on a seat and parallel link arms are joined to each other.

In the fifth embodiment, the parallel link arms 52, 53, 54, 55 are connected to the rods 60, 64, 69 that extend through the weights 50, 51. However, as shown in FIG. 19, a nut 80 may be welded to the weight 51 (50), the end of the link arm 52 (53, 54, 55) may be loosely fitted over the nut 80, and a bolt 52 may be threaded in the nut 80 with a washer 81 interposed therebetween.

Figure 20:
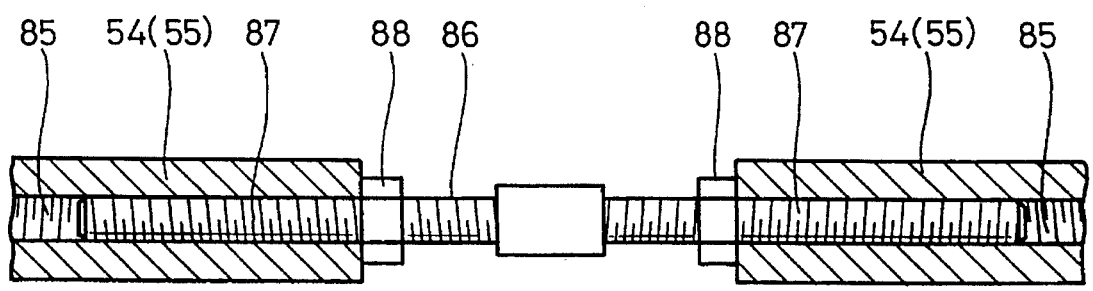
FIG. 20 is a fragmentary cross-sectional view of another mechanism for adjusting the length of the parallel link arms.

The rods 60, 64, 69 extending through the weights 50, 51 are disposed parallel to each other and perpendicularly to the link arms 52, 53, 54. The link arms 54, 55 have respective mechanisms for adjusting their overall length. These length adjusting mechanisms are identical in structure to the length adjusting mechanism shown in FIG. 11. However, as shown in FIG. 20, the link arms 54, 55 may be in the form of a pipe and have nut portions 85 in confronting ends thereof, the nut portions 85 having threads cut in opposite directions, and bolt portions 87 on opposite ends of a rod 86 may be threaded in the respective nut portions 85. Nuts 88 are threaded over the rod 86 and held against the confronting ends of the link arms 54, 55 to prevent the rod 86 from loosening. The length of the link arms 54, 55 can be adjusted by turning the rod 86.

A method of controlling the motor vehicle vibrating system according to the fifth embodiment is essentially the same as the method for controlling the motor vehicle vibrating systems according to the first and second embodiments.

In the fifth embodiment, as with the third embodiment, the vibrating point P to which vibrations are applied by the first vibrator 14 is positioned substantially centrally on the rear axle 5 for vibrating a central portion of the rear axle 5. Therefore, it is possible to prevent the motorcycle from swinging laterally when it is vibrated though the motorcycle would otherwise tend to swing laterally due to its own structural features, i.e., a smaller width than three- or four-wheel motor vehicles such as automobiles. In addition, the vibrating rod is also prevented from engaging another component such as a muffler located in the vicinity of the rear axle when the motorcycle swings laterally as it is vibrated.

Furthermore, as with the third embodiment, strain gages are attached to laterally spaced suspension members 3 by which the front axle 2 is supported. The lengths of the link arms 26 are adjusted to equalize loads applied to the suspension members 3 while the loads are being checked by the strain gages. With the lengths of the link arms 26 having been thus adjusted, the link arms 26 can rigidly be connected to each other by the cross members 43. When the motorcycle is thereafter vibrated, it is prevented from laterally swinging.

When the motorcycle is forcibly vibrated by the vibrators 14, 15, 16, since the first and second weights 50, 51 placed on the seat 49 are supported fully independently of the seat 49, the first and second weights 50, 51 move vertically with a slight time lag as the seat 49 moves vertically, following the vertical movement of the seat 49. Accordingly, the weights 50, 51 move in the same pattern as riders who would actually sit on the seat 49.

Because the first weight 50 is supported by the parallel link arms 54, 55 extending from the reactive jig 25, the first weight 50 is prevented from moving laterally across the link arms 54, 55. Therefore, even when the motorcycle is vibrated strongly enough to cause suspension bottoming, the first weight 50 does not shift laterally with respect to the seat 49. The parallel link arms 54, 55 which support the first weight 50 extend from the reactive jig 25 by which the rear axle 5 is supported. Thus, the parallel link arms 54, 55 move in the same manner as the parallel link arms 26 that support the rear axle 5, with the result that the first weight 50 is also prevented from moving back and forth with respect to the seat 49. The second weight 51 that is supported by the first weight 50 through the parallel link arms 52, 53 is also prevented from moving back and forth with respect to the seat 49.

The first and second weights 50, 51 placed on the seat 49 are supported completely independently of the seat 49, and are freely movable vertically with respect to each other as they are connected to each other simply by the link arms 52, 53. The first and second weights 50, 51 are therefore movable in exactly the same manner as riders who would sit on the seat 49 in tandem. Consequently, the rider weight applying structure permits the motor vehicle vibrating system to simulate the load which would be applied from an actual road.

In the fifth embodiment, the third vibrator 16 is connected to the vibrating rod 20 through the link 16aa and the swing plate 18 so that the axis of the third vibrator 16 is directed vertically. However, the swing plate 18 may be dispensed with, and the third vibrator 16 may be directly connected to the vibrating rod 20 so that the axis of the third vibrator 16 is directed horizontally.

While the front and rear axles 2, 5 are directly vibrated by the first, second, and third vibrators 14, 15, 16 in the fifth embodiment, the front and rear axles 2, 5 may be vibrated through a relatively rigid member such as a wheel, hub, or the like.

In the fifth embodiment, the two weights 50, 51 interconnected by the parallel link arms 52, 53 are placed on the seat 49. However, only one weight may be placed on the seat 49.

In the fifth embodiment, when a rear portion of the motorcycle 1 is forcibly vibrated vertically by the vibrators, the weights 50, 51 which are placed on the seat 49 and supported fully independently of the seat 49 move vertically with a slight time lag as the seat 49 moves vertically, following the vertical movement of the seat 49. Accordingly, the weights 50, 51 move in the same pattern as riders who would actually sit on the seat 49. Consequently, the rider weight applying structure permits the motor vehicle vibrating system to simulate the load which would be applied from an actual road with riders on the seat 49.

The weights 50, 51 are limited against lateral movement as they are supported by the parallel link arms 26 extending from the reactive jig 25. Accordingly, even when the motorcycle is vibrated strongly enough to cause suspension bottoming, the weights 50, 51 do not shift laterally with respect to the seat 49. The parallel link arms 54, 55 which support the weights 50, 51 extend from the reactive jig 25 by which the rear axle 5 is supported. Thus, the parallel link arms 54, 55 move in the same manner as the parallel link arms 26 that support the rear axle 5, with the result that the weights 50, 51 are prevented from moving back and forth with respect to the seat 49.

Furthermore, when a rear portion of the motorcycle 1 is forcibly vibrated vertically by the vibrators, since the first and second weights 50, 51 which are placed on the seat 49 and supported fully independently of the seat 49, and also since the weights 50, 51 are interconnected simply by the link arms 26, the weights 50, 51 are freely movable in the vertical direction. The first and second weights 50, 51 are therefore movable in exactly the same manner as riders who would sit on the seat 49 in tandem. Consequently, the rider weight applying structure permits the motor vehicle vibrating system to simulate the load which would be applied from an actual road.

In the first through fifth embodiments, the motor vehicle vibrating system is designed to vibrate motorcycles. However, two of the illustrated motor vehicle vibrating system may be juxtaposed to provide a motor vehicle vibrating system for vibrating four-wheel motor vehicles.

Figure 21:
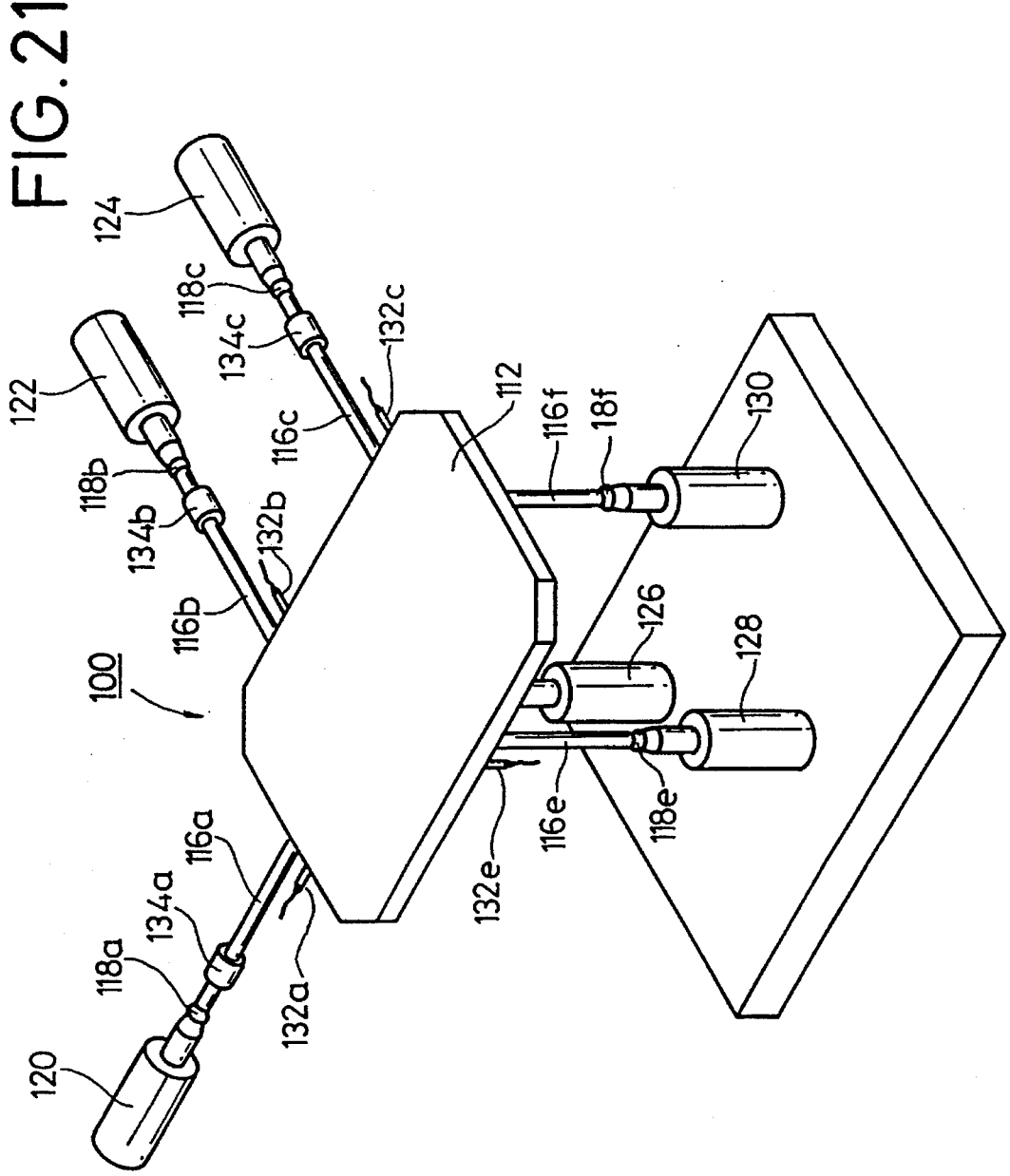
FIG. 21 is a perspective view of a vibrating table assembly of a three-dimensional vibrating system according to a sixth embodiment of the present invention.
Figure 22:
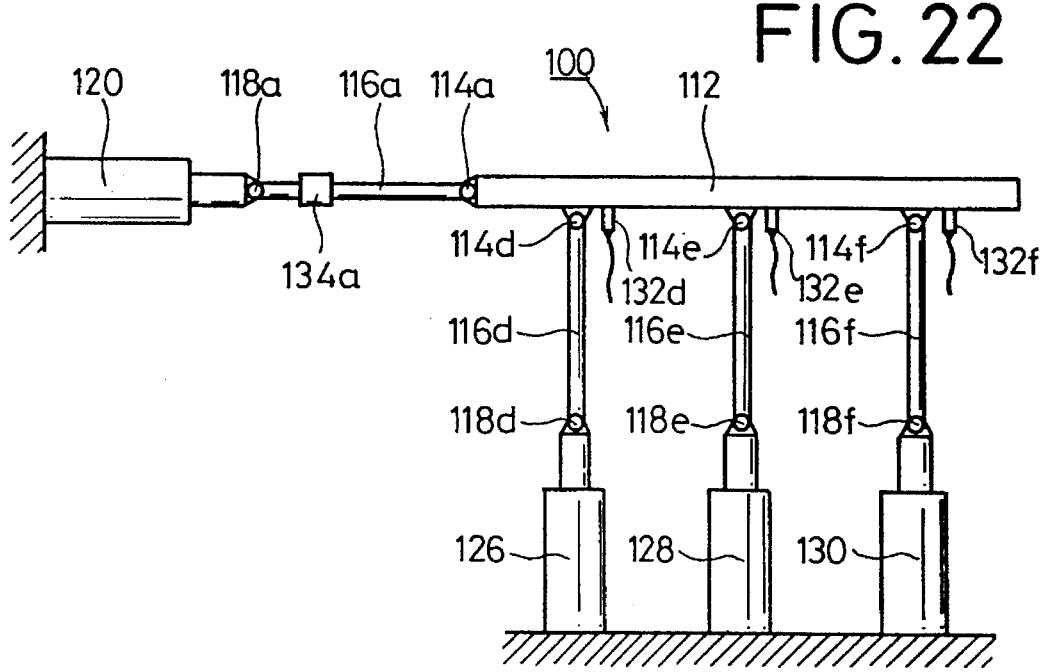
FIG. 22 is a side elevational view of the vibrating table assembly shown in FIG. 21.
Figure 23:
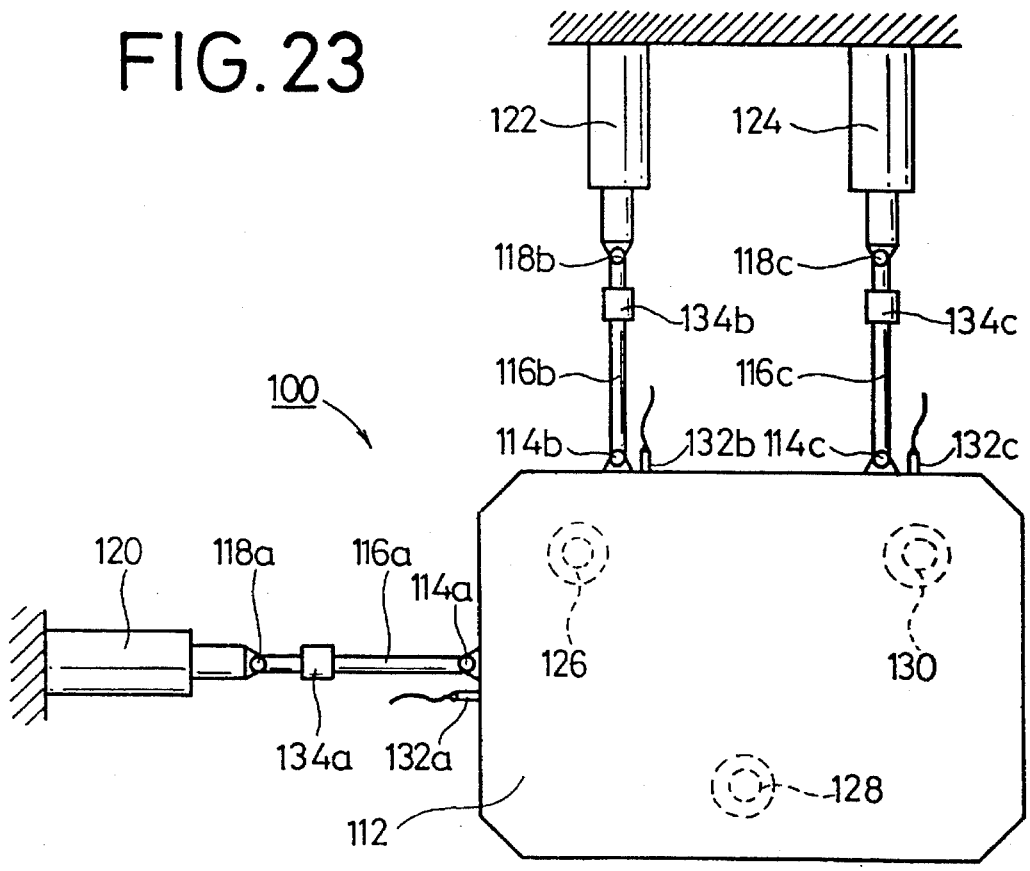
FIG. 23 is a plan view of the vibrating table assembly shown in FIG. 21.

A three-dimensional vibrating system for applying three-dimensional vibrations to an object being tested according to a sixth embodiment of the present invention will be described below with reference to FIGS. 21 through 23. The three-dimensional vibrating system has a three-dimensional vibrating table assembly 100 which includes a vibrating table 112 for placing thereon an object such as a product, an architectural model, a structural model, or the like.

Figure 24:
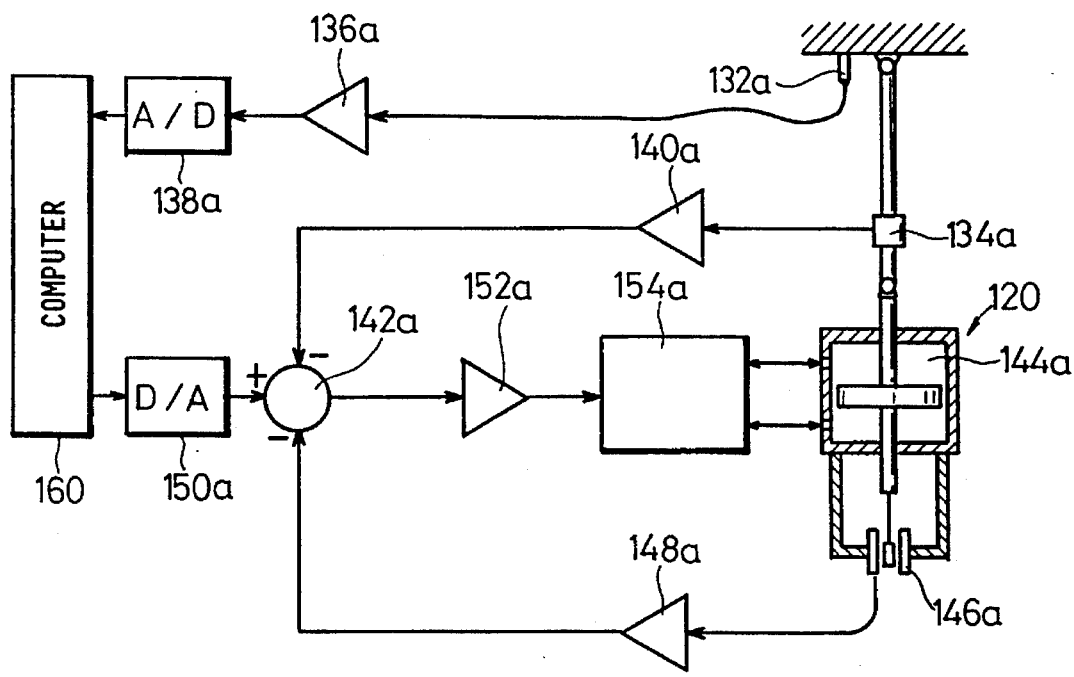
FIG. 24 is a diagram of a controller for controlling a vibrator for the vibrating table assembly of the three-dimensional vibrating system according to the sixth embodiment.

The three-dimensional vibrating table assembly 100 is connected to a horizontal X-axis vibrator 120 through a ball joint 114a, a vibrating rod 116a, and a ball joint 118a that are arranged in an X-axis direction. The horizontal X-axis vibrator 120 comprise a hydraulically-operated actuator 144a and a servovalve 154a (FIG. 24). The three-dimensional vibrating table assembly 100 is also connected to two hydraulically-operated horizontal Y-axis vibrators 122, 124 and three hydraulically-operated vertical Z-axis vibrators 126, 128, 130 through ball joints 114b through 114f, vibrating rods 116b through 116f, and ball joint 118b through 118f that are arranged in Y- and Z-axis directions. The horizontal Y-axis vibrators 122, 124 are arranged such that they apply respective moments in opposite directions about the center of gravity of the vibrating table 112 to be vibrated. As shown in FIGS. 21 and 23, the vertical Z-axis vibrators 126, 128, 130 are positioned in alignment with respective vertices of a triangle on the bottom of the vibrating table 112. Transducers which comprise accelerometers 132a through 132f are mounted on the vibrating table 112 near the ball joints 114a through 114f, respectively. The horizontal X-axis vibrator 120 and the horizontal Y-axis vibrators 122, 124 are associated with respective transducers which comprise load detectors 134a through 134c for detecting applied pressures, the load detectors 134a through 134c being mounted on the respective vibrating rods 116a through 116c.

Figure 25:
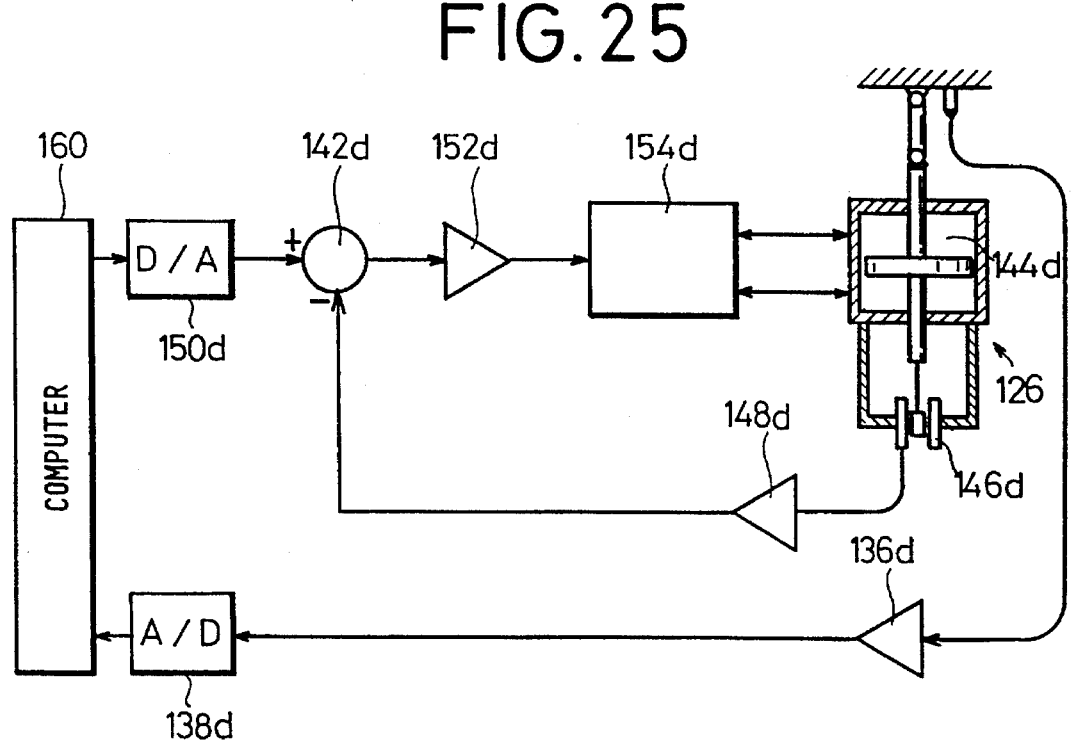
FIG. 25 is a diagram of a controller for controlling another vibrator for the vibrating table assembly of the three-dimensional vibrating system according to the sixth embodiment.

Output signals produced by the accelerometers 132a through 132f and the load detectors 134a through 134c are processed by a controller shown in FIG. 24. The controller shown in FIG. 24 is of an arrangement only for processing output signals produced with respect to the horizontal X-axis vibrator 120, for example. The vibration-induced acceleration of the vibrating table 112 is detected by the accelerometer 132a. The detected acceleration signal is amplified by a sensor amplifier 136a, and the amplified signal is converted into a digital signal by an A/D converter 138a. The pressure that is applied to the vibrating table 112 by the vibrating rod 116a is detected by the load detector 134a. The controller also has a feedback amplifier 140a for amplifying the detected pressure or load signal from the load detector 134a, a feedback amplifier 148a for amplifying a displacement signal indicative of a displacement of the vibrating table 112, the displacement signal being detected by a differential transformer 146a mounted on an end of the actuator 144a, a D/A converter 150a for converting a digital signal from a computer 160 into a digital signal, a processor 142a supplied with the feedback signals from the feedback amplifiers 140a, 148a and the digital signal from the D/A converter 150a, and a power amplifier 152a for amplifying an output signal from the processor 142a. Controllers associated with the respective horizontal Y-axis vibrators 122, 124 are identical in structure to the controller shown in FIG. 24. Each of controllers associated with the vertical Z-axis vibrators 126, 128, 130 is shown in FIG. 25 in which those parts that identical to those shown in FIG. 24 are denoted by identical reference numerals with a suffix d. As shown in FIG. 25, the controllers associated with the vertical Z-axis vibrators 126, 128, 130 have no load detectors and no feedback amplifiers which would otherwise connected thereto. The controller shown in FIG. 25 is of an arrangement only for processing output signals produced with respect to the vertical Z-axis vibrator 126, for example.

The three-dimensional vibrating table assembly 100 operates as follows:

The horizontal X-axis vibrator 120 and the horizontal Y-axis vibrators 122, 124 are controlled in both displacement and load. An appropriately adjusted selection of gains for displacement and load control is effective to prevent excessively large loads from being imposed on the vibrating table 112, and also to displace the vibrating table 112 to a desired position. The vertical Z-axis vibrators 126, 128, 130 are controlled in displacement.

Figure 26:
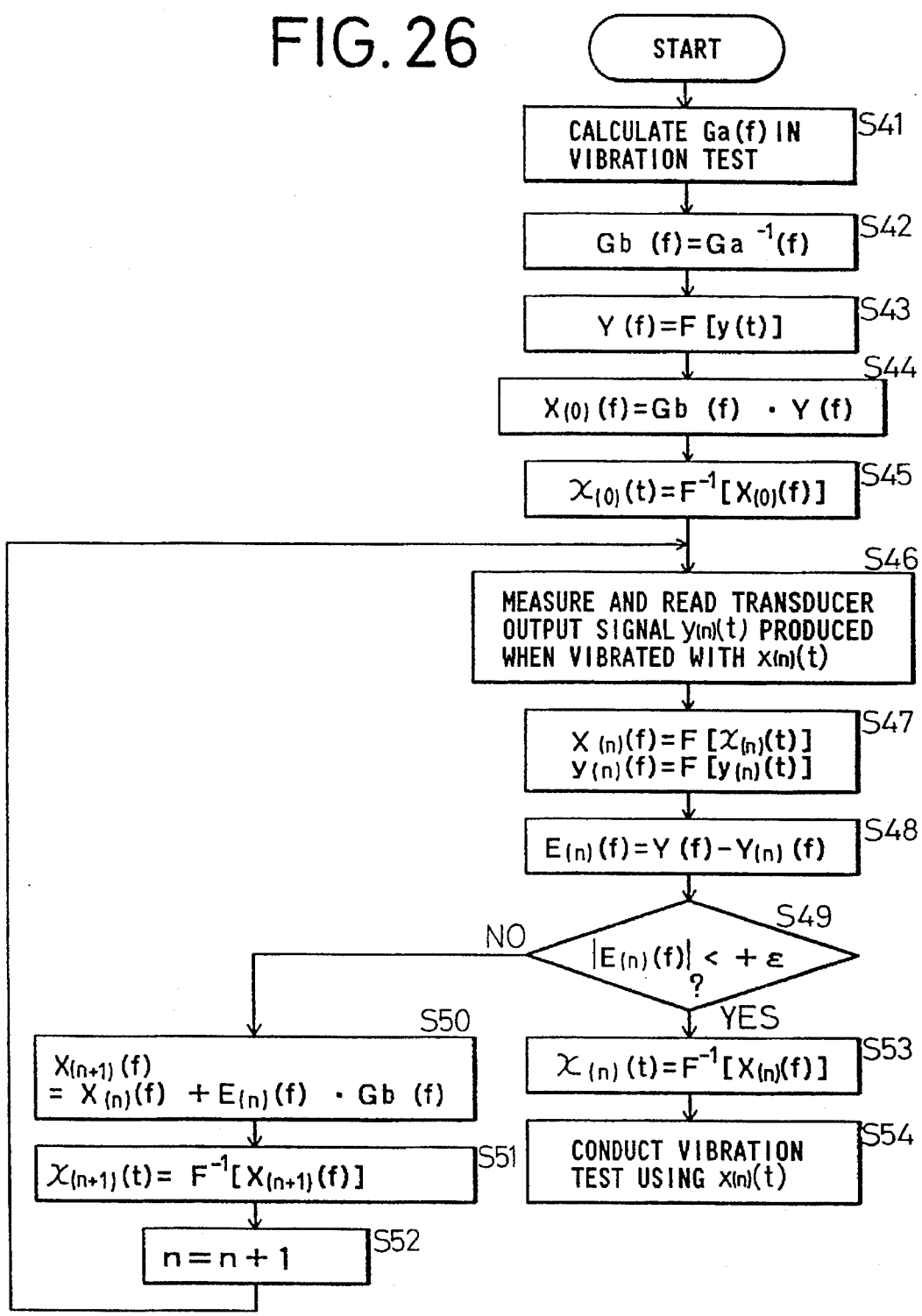
FIG. 26 is a flowchart of a process for determining a vibrating signal using a transfer function in the three-dimensional vibrating system according to the sixth embodiment.

An operation sequence of the vibrating system according to the sixth embodiment will be described below with reference to the flowchart of FIG. 26.

First, a noise signal which is indicative of white noise, noise having $1/f^2$ characteristics, or any of various noises that are experimentally produced is applied as a vibrating signal $x_{in}(t)$ to vibrate the vibrating table 112. An output signal $y_{out}(t)$ that is produced by a transducer is measured. Then, a transfer function Ga(f), which is a ratio of Fourier transformation between the output signal $y_{out}(t)$ and the vibrating signal $x_{in}(t)$, is determined from the output signal $y_{out}(t)$ and the vibrating signal $x_{in}(t)$ in a step S41.

Then, an inverse function Gb(f) of the transfer function Ga(f) is calculated in step S42, and an output signal y(t) to be obtained by vibrations is subjected to Fourier transformation producing an output signal Y(t) in step S43. The step S43 is followed by step S44 in which the transfer function Gb(f) is multiplied by the output signal Y(f) determining a vibrating signal $X_{(0)}(f)$. The Fourier-transformed vibrating signal $X_{(0)}(f)$ is then subjected to inverse Fourier transformation, providing an initial value $x_{(0)}(t)$ for the vibrating signal in step S45.

Then, repeated corrective calculations are carried out. Specifically, after the step S45, a vibrating signal $x_{(n)}(t)$ using the vibrating signal $x_{(0)}(t)$ as an initial value is supplied to vibrate the vibrating table 112, and a transducer output signal $y_{(n)}(t)$ is measured and read in a step S46. Then, the vibrating signal $x_{(n)}(t)$ and the read output signal $y_{(n)}(t)$ are subjected to Fourier transformation, providing respective results $X_{(n)}(f)$, $Y_{(n)}(f)$ in a step S47. Then, the difference $|Y(f)|-|Y_{(n)}(f)|$ is calculated to obtain an error $E_{(n)}(f)$ in step S48. The step S48 is followed by step S49 which determines whether the absolute value of the error $E_{(n)}(f)$ is smaller than a predetermined allowable error $\epsilon$.

If the error $E_{(n)}(f)$ is not smaller than the allowable error $\epsilon$ in the step S49, then a step S50 carries out the corrective calculation $[X_{(n)}(f)+E_{(n)}(f)\cdot Gb(f)]$ to correct $X_{(n)}(f)$ with $E_{(n)}(f)\cdot Gb(f)$. Then, $X_{(n+1)}(f)$ is converted back to a time-domain signal $X_{(n+1)}(t)$ by Fourier transformation in step S51, and thereafter the number n is incremented by +1 in a step S52. Then, control returns to the step S46.

If the error $E_{(n)}(f)$ is smaller than the allowable error $\epsilon$ in the step S49, then $X_{(n)}(f)$ is converted to $x_{(n)}(t)$ by inverse Fourier transformation in step S53, and thereafter the vibrating table 112 is vibrated in a test with the signal $x_{(n)}(t)$ in step S54. Therefore, a load of a target value can be imposed on the vibrating table 112. As described above, the initial value $x_{(0)}(t)$ for the vibrating signal is determined, and the error of the transducer output signals is reduced according to the repeated corrective routine so as to approach a target value for thereby determining a vibrating signal $x_{(n)}(t)$ with respect to an output signal y(t) that is to be eventually obtained as a target value by vibrations.

Figure 27:
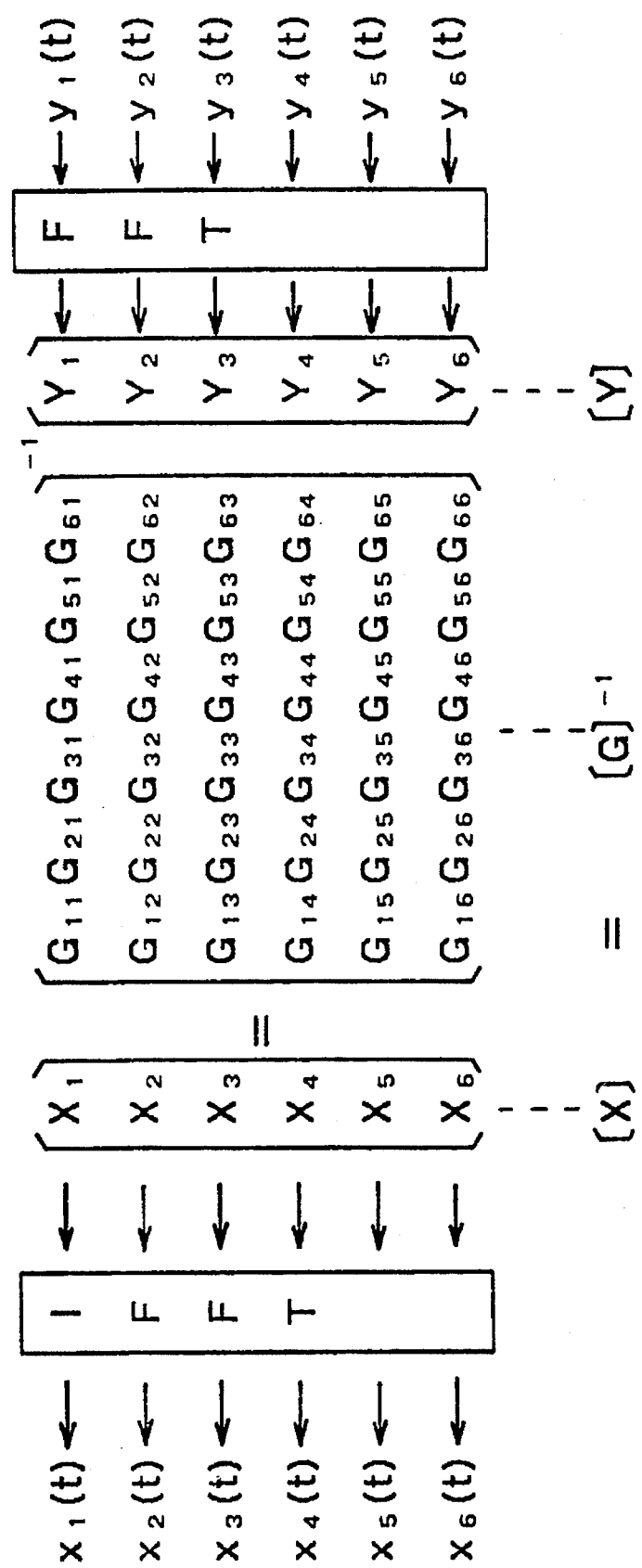
FIG. 27 is a diagram illustrative of calculations for determining a vibrating signal for the vibrating table of the three-dimensional vibrating system according to the sixth embodiment, using a transfer function matrix.

The above process has been described with respect to a single-axis vibrating system. The process will be carried out with respect to a six-axis vibrating system as follows: First, the horizontal X-axis vibrator 120 is solely vibrated in a test, and output signals from the accelerometers 132a through 132f are detected and divided by the input signal applied to the horizontal X-axis vibrator 120. The above procedure is carried out with respect to all of the six vibrators 120, 122, 124, 126, 128, 130, thus determining a transfer function matrix [G] (see FIG. 27). Then, an inverse matrix $[G]^{-1}$ of the transfer function matrix [G] is determined, and a group of vibrating signals [X] (X1~X6) of a first Fourier transform which correspond to a Fourier-transformed target signal matrix [Y] (Y1~Y6) of the vibrators 120, 122, 124, 126, 128, 130 is determined according the matrix calculation shown in FIG. 27. The vibrators 120, 122, 124, 126, 128, 130 are actually actuated with vibrating signals that are inverse Fourier transforms of the signals $X_1\sim X_6$.

An error matrix is now determined between the target signal matrix and the output signal matrix that is Fourier transforms of the output signals measured by the transducers. The vibrating table 112 is then vibrated with a new group of vibrating signals to which there has been added a corrective signal that is produced by multiplying the error matrix by the inverse matrix $[G]^{-1}$ of the transfer function matrix. As with the single-axis vibrating system, the repeated corrective routine is repeatedly executed until the error falls within a predetermined error range. Actual vibrations can then be simulated with the group of vibrating signals thus determined.

Vibration tests in various vibration modes are conducted using the inverse matrix $[G]^{-1}$ of the transfer function matrix. To prevent the vibrating table 112 about the X-, Y-, and Z-axes, the same target signal y(t) is given to the vertical Z-axis vibrators 126, 128, 130, and the same target signal y(t) is given to the horizontal Y-axis vibrators 122, 124. The highly accurate vibrating signal x(t) is determined by the controllers based on the respective target signals y(t) in the manner described above, and the vibrators 120, 122, 124, 126, 128, 130 are actuated with the vibrating signal x(t). Accordingly, it is possible to hold the vibrating table 112 horizontally, and to prevent the vibrating table 112 from rotating about the Z-axis.

The displacement feedback signals from the differential transformers 146d through 146f of the vertical Z-axis vibrators 126, 128, 130 are supplied to the respective processors 142d through 142f, which process the supplied signals together with the signals from the computer 160 to transmit control signals to displace the vibrating table 112 to a desired position. The load feedback signals from the load detectors 134a through 134c, as well as the displacement feedback signals from the differential transformers 146a through 146c of the horizontal X- and Y-axis vibrators 120, 122, 124, are supplied to the respective processors 142a through 142c, which process the supplied signals together with the signals from the computer 160. Since the gains for load and displacement control are adjusted to a suitable ratio, the vibrating table 112 can be displaced to a desired position, and can be prevented from being subjected to an excessively large load.

Inasmuch as the three-dimensional vibrating table assembly 100 is displaced only by the vibrating rods 116a through 116f coupled to the respective vibrators 120, 122, 124, 126, 128, 130, it can be vibrated in large amplitudes. The vibrating table 112 is supported well in balance as the vertical Z-axis vibrators 126, 128, 130 are positioned at the respective vertices of a triangle on the vibrating table 112. When the transfer function matrix is determined, it is possible to displace only one of the vertical Z-axis vibrators 126, 128, 130 while keeping the other two vertical Z-axis vibrators at rest (If four or more vibrators are provided in the direction of one axis, it is impossible to hold three or more of the vibrators when one of them is displaced). The vibrating table 112 is prevented from angularly moving about the X-, Y-, and Z-axes by applying input signals so that the same output signal can be obtained with respect to all of the vertical Z-axis vibrators 126, 128, 130 and the same output signal can be obtained with respect to all of the horizontal Y-axis vibrators 122, 124.

The vibrated state of the three-dimensional vibrating table can be controlled with high accuracy using the inverse matrix of the determined transfer function matrix. Since the vibrating table is vibrated only by the vibrating rods, it can be vibrated in large amplitudes. The vibrating table is supported in good balance as the vertical Z-axis vibrators are positioned at the respective vertices of a triangle on the vibrating table. When the transfer function matrix is determined, it is possible to displace only one of the vertical Z-axis vibrators while keeping the other two vertical Z-axis vibrators at rest. The vibrating table is kept horizontally against rotation by the controllers which control the the three vertical Z-axis vibrators to produce the same output signal and also control the two horizontal Y-axis vibrators that apply opposite moments to the vibrating table to produce the same output signal, using the the inverse matrix of the transfer function matrix. Consequently, the three-dimensional vibrating table assembly can be of a simple structure composed of six vibrators and transducers, and can well simulate earthquakes or other vibrations.

Although certain preferred embodiments of the present invention have been shown and described in detail, it should be understood that various changes and modifications may be made therein without departing from the scope of the appended claims.

What is claimed is:

1. A vibrating system for vibrating a two-wheeled motor vehicle having front and rear axles rotatably supported on a motor vehicle frame, comprising:

a first vibrator including a first vertically disposed cylinder for vertically vibrating the rear axle;

a second vibrator including a second vertically disposed cylinder for vibrating the front axle;

a third vibrator including a third vertically disposed cylinder for vibrating one of the front and rear axles back and forth in a longitudinal direction of the motor vehicle, said third vibrator further including a vibrating rod connected through a swing linkage to a cylinder rod of said third vertically disposed cylinder, said vibrating rod disposed substantially transverse with respect to said cylinder rod; and a base supporting said first, second and third vertically disposed cylinders, said first, second and third vertically disposed cylinders each being vertically and non-pivotally mounted on said base.

2. A vibrating system according to claim 1, further comprising:

a reactive jig for limiting the other of the front and rear axles through a link mechanism against back-and-forth movement in the longitudinal direction of the motor vehicle;

load detecting means on said vibrating rod, for detecting a load imposed on the vibrating rod; and a controller for controlling said third vibrator when said first and second vibrators operate so that the load detected by said load detecting means is of a constant value at all times.

3. A vibrating system according to claim 1, further including spacers fitted over at least one of the front and rear axles and disposed inwardly of spaced members extending from the motor vehicle members, said at least one of the front and rear axles having a vibrating point on a substantially central portion thereof to which vibrations are applied from the vibrator.

4. A vibrating system according to claim 3, further comprising:

a reactive jig for limiting the other of the front and rear axles through a link mechanism against back-and-forth movement in the longitudinal direction of the motor vehicle;

said link mechanism comprising a pair of parallel link arms spaced transversely from each other, a cross member interconnecting said link arms, said link arms being adjustable in length relatively to each other.

5. A vibrating system according to claim 4, further including strain gages attached to respective suspensions which support the front axle.

6. A vibrating system according to claim 1, further comprising:

a reactive jig disposed behind the rear axle, for vertically movably supporting the rear axle through a link mechanism having a pair of parallel link arms extending forwardly and spaced transversely from each other; and a rider weight applying structure including a weight corresponding to the weight of a driver of the motor vehicle and placed on a seat of the motor vehicle, said weight being vertically movably supported by a second pair of parallel link arms extending forwardly from said reactive jig.

7. A vibrating system according to claim 6, further including a second weight corresponding to the weight of a passenger of the motor vehicle and placed on the seat of the motor vehicle, said weight and said second weight being vertically movably coupled to each other by a third pair of parallel link arms, said second weight being vertically movably supported by said second pair of parallel link arms extending forwardly from said reactive jig.

* * * * *